(12) United States Patent
Cutillo

(10) Patent No.: US 9,747,336 B1
(45) Date of Patent: Aug. 29, 2017

(54) METHOD AND SYSTEM FOR CREATING HYPERLINKS THAT CYCLE MULTIPLE SEARCH TERM RELEVANT WEB SOURCES AND SELF-RESOLVE TO A SINGLE RESOURCE BY MEASURING AUDIENCE INTERACTION

(71) Applicant: Justin Cutillo, Gilford, NH (US)

(72) Inventor: Justin Cutillo, Gilford, NH (US)

( * ) Notice: Subject to any disclaimer, the term of this patent is extended or adjusted under 35 U.S.C. 154(b) by 496 days.

(21) Appl. No.: 14/572,403

(22) Filed: Dec. 16, 2014

(51) Int. Cl.
  *G06F 17/30* (2006.01)
  *G06F 17/22* (2006.01)

(52) U.S. Cl.
  CPC .... *G06F 17/30457* (2013.01); *G06F 17/2235* (2013.01)

(58) Field of Classification Search
  None
  See application file for complete search history.

(56) References Cited

U.S. PATENT DOCUMENTS

| | | | |
|---|---|---|---|
| 8,583,675 B1 * | 11/2013 | Haahr | G06F 17/30442 707/721 |
| 8,661,029 B1 * | 2/2014 | Kim | G06F 17/3053 707/723 |
| 8,694,511 B1 * | 4/2014 | Corduneanu | G06F 17/3053 707/723 |
| 9,110,975 B1 * | 8/2015 | Diligenti | G06F 17/30646 |

* cited by examiner

*Primary Examiner* — Son T Hoang
(74) *Attorney, Agent, or Firm* — Catherine Napjus; Michael J. Persson; Lawson, Persson & Chisholm, PC

(57) ABSTRACT

A user submits a search query. The query submission results in a result set, including a number of listings, and a unique hyperlink associated in a database with the search query, the result set, and the listings. The user distributes the unique 5 hyperlink to new members who select the unique hyperlink. Each new member who selects the unique hyperlink is presented with a listing from the result set. The time they spend viewing the listing is recorded. An algorithm based on the recorded viewing time ultimately filters the listings to a single best-fit listing for the original query and permanently associated it with the unique hyperlink.

37 Claims, 12 Drawing Sheets

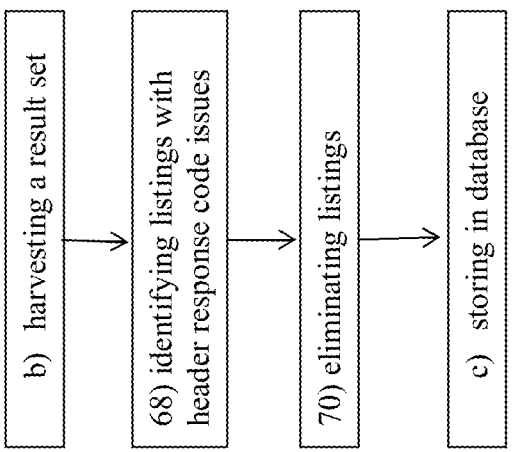
FIG. 3D
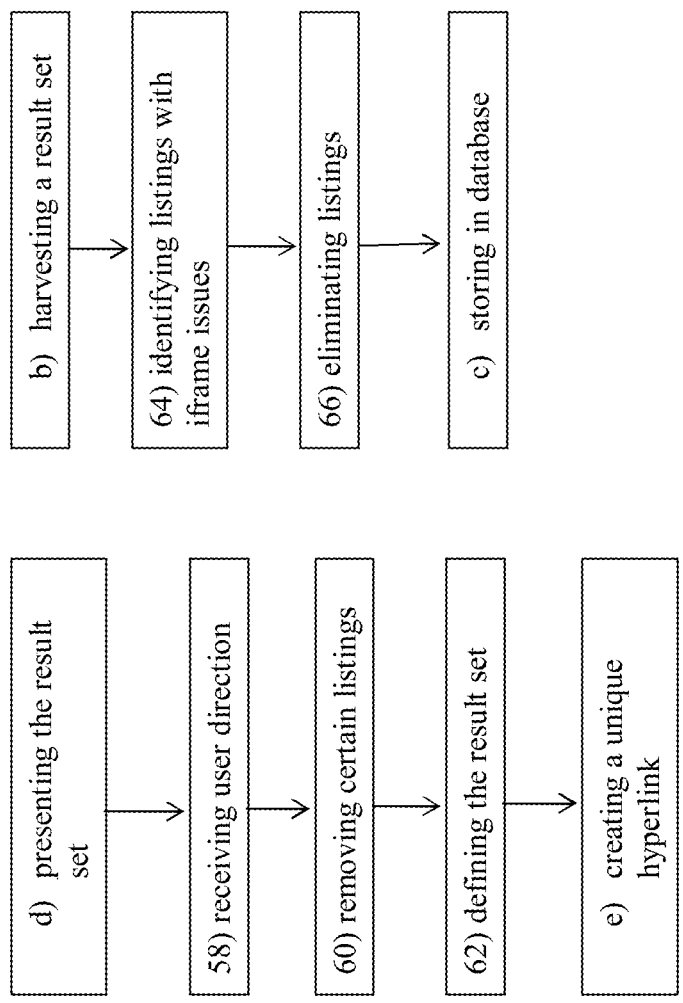
FIG. 3C
FIG. 3E

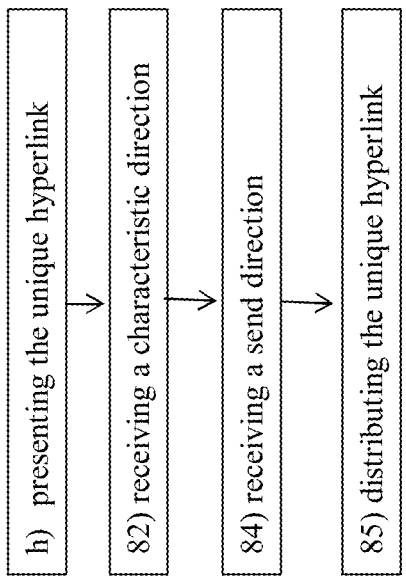
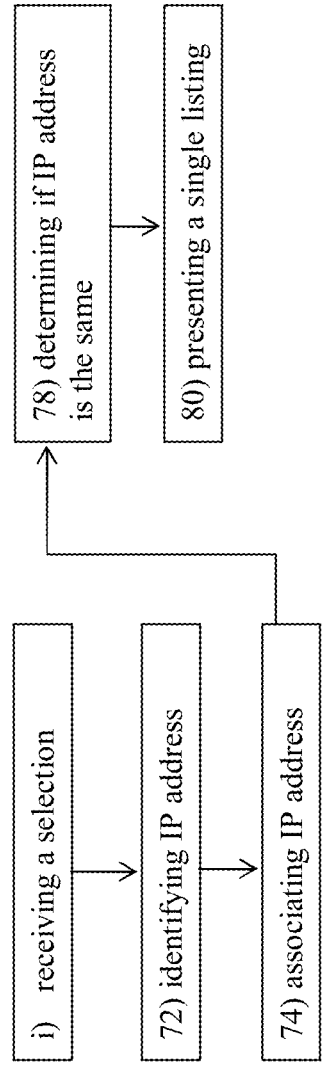

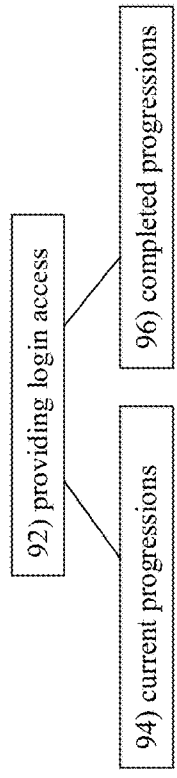
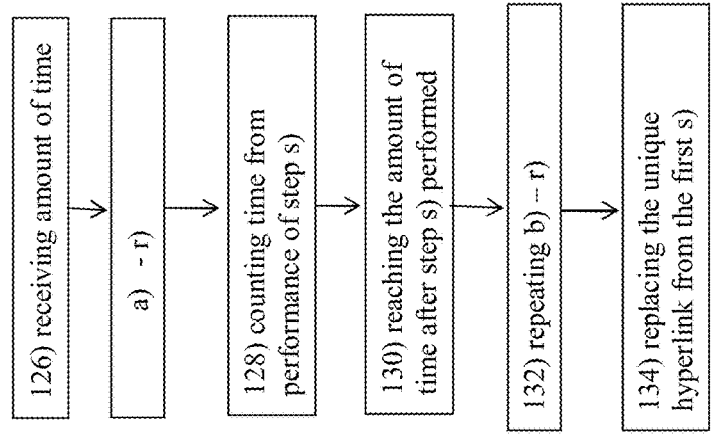
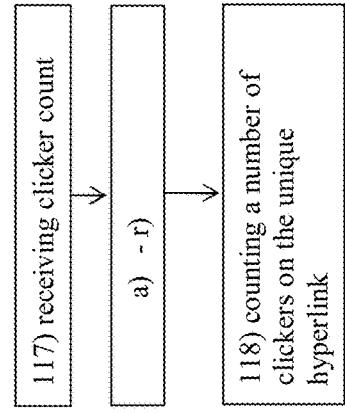
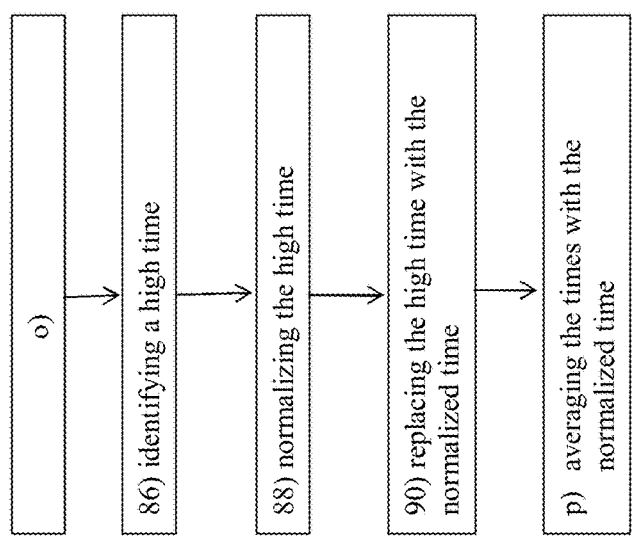

METHOD AND SYSTEM FOR CREATING HYPERLINKS THAT CYCLE MULTIPLE SEARCH TERM RELEVANT WEB SOURCES AND SELF-RESOLVE TO A SINGLE RESOURCE BY MEASURING AUDIENCE INTERACTION

FIELD OF THE INVENTION

The present invention relates generally to internet searching, and specifically, to a method of internet searching that produces a single, best reference for a search query.

BACKGROUND

By its nature, the internet is a system of interconnected networks. These interconnections rely heavily on the hyperlink acting as a bridge between independent sources of information. In large part the value of the internet is derived from the quality of the information and the optimal linking of useful and complimentary information sources.

The history of the worldwide web has been shaped in large part by the companies and organizations that can most effectively leverage these information resources. Common examples of this strategy include search engines that seek to organize and order indexes by relevancy to search terms. Primarily, search engines rely on machine learning to create quality scores that relate potential search queries to sources available on the web. This system has proven extremely effective under the context of a user entering a particular query and being provided with a valuable stable of organized and indexed results. On the other hand, while a search engine may excel at providing a list of sources with high relevancy for a particular search term, this index is assembled in a vacuum relative to the content it may be used in. The top result for a particular search term may not be the best source to place in a particular piece of content.

Web content is a human creation. Producing a blog article, developing a website or posting a link on social media are subjective, personal acts. Generally, these acts of creation seek to appeal to and share with a particular audience. In many cases, this act of sharing involves a specific source or is buoyed by a series of complimentary sources in the form of a hyperlink. Appealing to a particular audience is a primary goal of content creation, but current methods for researching source information inherently rely on a definition of relevancy based on the macro-audience of all internet users. In many cases, content creators provide a more informed selector of sources for their particular work, relying first on search engines and then on their digression to choose a final result. In all cases, the resources that are included as links in a particular piece of content are incorporated as educated guesses as to the particular sources that will most effectively appeal to their audience.

Social media is driven by human interaction. Many services rely on users voting on content in order to determine its rank and likelihood of being viewed by the general audience. A popular social media platform marketed under the trademarks REDDIT and ASK REDDIT is an example of this standard in social media sites. While sites like the REDDIT website do a particularly good job of surfacing the most interesting content submitted to the site, this model of submission and voting is flawed. The vast majority of users on sites of this nature avoid the "active interaction" of voting for content and merely consume the sources that have been influenced by a small percentage of the user base. Ultimately the content being served and selected is not derived from the lurking users who account for the majority of the audience.

Another example of user input affecting content is A/B testing, marketed under the trademark GOOGLE. This feature allows a web developer to set up competing landing pages on the same website. These pages are routed and served at random to different web users by analytics. As a segment of the users interact with page A and a segment interacts with page B, their behavior is measured against a common conversion standard. Once the testing period has served the pages to a large enough sample size of users to determine the statistically most effective page relative to the conversion goal, the service can permanently serve this page to all future users.

Another service that does not involve user input or interaction, but that returns a single result is that marketed under the trademarks I'M FEELING LUCKY and GOOGLE. This search functionality allows a user to enter a search query, click the "I'm Feeling Lucky" button and be randomly taken to a single relevant result in the search set for that term. Although this service may, in some cases, simplify basic searching, it represents no efforts toward suitability for a specific audience or application, but rather is an offshoot of the same relevancy functionality of a basic search engine. The "I'm Feeling Lucky" feature is truly one dimensional and involves no deeper level measurements or functionality.

As discussed above, current examples of social voting rely on multiple users posting resources to an aggregator site where the audience votes for those resources only in the context of the aggregator site's culture/environment. This process fails to incorporate the influence of the content and the specific audience of the content in which those links will eventually be reposted. A particular resource might make a great top result in the context of an active social voting site, but that same resource may be a poor fit for the audience of a niche blog or a person's personal social media page. The social voting sites also fail to capture the influence of the passive, non-voting consumers of the resource that, in fact, make up a significant majority of the audience. Moreover, while search engine results use multiple factors to determine relevancy and rankings for the results they serve in the context of a user entering a query and interacting with resources presented for that query, this process fails to tailor relevancy for a resource within the context of a particular piece of content being viewed by a particular audience. For example, a current news story, "Canyonlands National Parks Ban Drones," may be the first search engine results for the news search query "drones," but the result "Legislature mulls curbs on use of aerial drones by paparazzi" might be a better fit for a news blog whose audience enjoys entertainment stories. As content creators are generally responsible for selecting a resource from a search results set to best fit their content, the results of typical social media sites and search engines may require significant additional review before reliable resource selection.

Therefore there is a need for a service that provides a single "best fit" reference for a search query where the determination for the best fit reference is driven by user input from a specific subset of internet users.

SUMMARY OF THE INVENTION

The present invention is a method, system, and computer software for determining a single best fit reference for a search query where the determination for the best fit reference is driven by member input from a specific subset of internet users. The computer software of the present invention causes a computer to perform the steps of the method of the present invention. The system of the present invention performs the steps of the method of the present invention.

In its most basic form, the method of the present invention is as follows: A user submits a search query, with the ultimate intention of determining the best fit result for this search query as determined by a subset of internet users, as described below. The user's search query submission will result in the presentation of a result set, including a number of listings, and a unique hyperlink that is associated in a database with the search query, the result set, and the listings. The user then distributes the unique hyperlink via standard internet channels, such as through social interaction media, embedding in a blog, or email. Recipients of the unique hyperlink who select the unique hyperlink or click it are referred to herein as "new members." Each new member who clicks on the unique hyperlink will be presented with one of the listings in the result set. The time they spend viewing the listing is measured and recorded. Data regarding the time spent viewing the various listings is continuously collected as various new members continue to click on the unique hyperlink. Once sufficient data is retrieved, the times collected for each of the listings are averaged and then the average times of the listings are ranked against one another. The result set is then filtered, eliminating some listings from the result set, and the process is repeated with the new, smaller result set. The process is continued until a final result set containing only a single best-fit listing is determined. That listing is then permanently associated in the database with the unique hyperlink and the original search query.

One of ordinary skill in the art will recognize that certain aspects of this method may be performed in various ways. For a first example, various methods exist to limit the original result set by the number of listings included or by the content of the listings included. For a second example, various methods exist regarding how and to whom the unique hyperlink is distributed. For a third example, various methods exist regarding the viewing times, such as accounting for listings with low and high outlying times. For a fourth example, various methods exist regarding how the result set is culled. Specific examples of each of these variations are discussed below.

Hereinafter, it should be understood that the term "mutating link" refers generally to the service provided by the method of the present invention or specifically to the unique hyperlink created during the execution of the method. Mutating links rely on a search engine-like service that gathers results based on a particular search query. The primary difference between a standard hyperlink and a mutating link is that the latter uses the audience as a sounding board to help select the most appropriate source from among a stable of results. By cycling through the entire result set, one user at a time, and measuring passive interaction for each result, mutating links utilize an algorithm to reorder relevancy of the result set according to the content in which the results are placed. Ultimately, mutating links resolve to the best-fitting result as determined through interaction. This process enables the audience to truly shape the end sources for each piece of content in which they are used. This can be as simple as a mutating link shared on social media being determined by a user's audience of friends and family or a niche political blog leveraging audience interaction to select the slant of a current events link posted therein. Mutating links empower the general internet user to shape the interconnecting paths that ultimately bring value to the internet.

The intention of the present invention is to harvest the passive interaction of the audience and the context of the content in which it is shared to help determine the final result. Therefore, if the unique hyperlink is embedded in a blog, the hyperlink will be interpreted in the context of the blog. How long the new member views the hyperlink will be a function of not only the viewer's interest in the hyperlink itself, but also of the mindset created by the context in which the hyperlink is presented. If a piece of content is compelling, users are likely to spend more time on that resource than an alternative, less appropriately selected resource. Mutating links harnesses this passive interaction to bring all users to the forefront of the selection process for a resource. This model inherently empowers the entire audience to influence the source selection of the final result.

Mutating links therefore have significant advantages over the prior art. Unlike the REDDIT website, which ostensibly indicates best content based on viewer content, the present service will take into account all new members' feedback via their viewing time, as opposed to only the gunners who take the time to actively vote for content on the REDDIT website. Unlike A/B testing, which is generally implemented on the same source resources, the present service pulls in a variety of completely unique sources to be considered in the result set. Unlike the I'M FEELING LUCKY service, which randomly takes a user to a single relevant search result, the present service includes a measurement phase and algorithm to best fit the final search result with the specific audience of the medium in which it was posted.

These aspects of the present invention are not meant to be exclusive and other features, aspects, and advantages of the present invention will be readily apparent to those of ordinary skill in the art when read in conjunction with the following description and accompanying drawings.

BRIEF DESCRIPTION OF THE DRAWINGS

FIGS. 3A-3K are flow charts illustrating additional steps in the method of the present invention beyond its most basic form.

DETAILED DESCRIPTION

Figure 1:
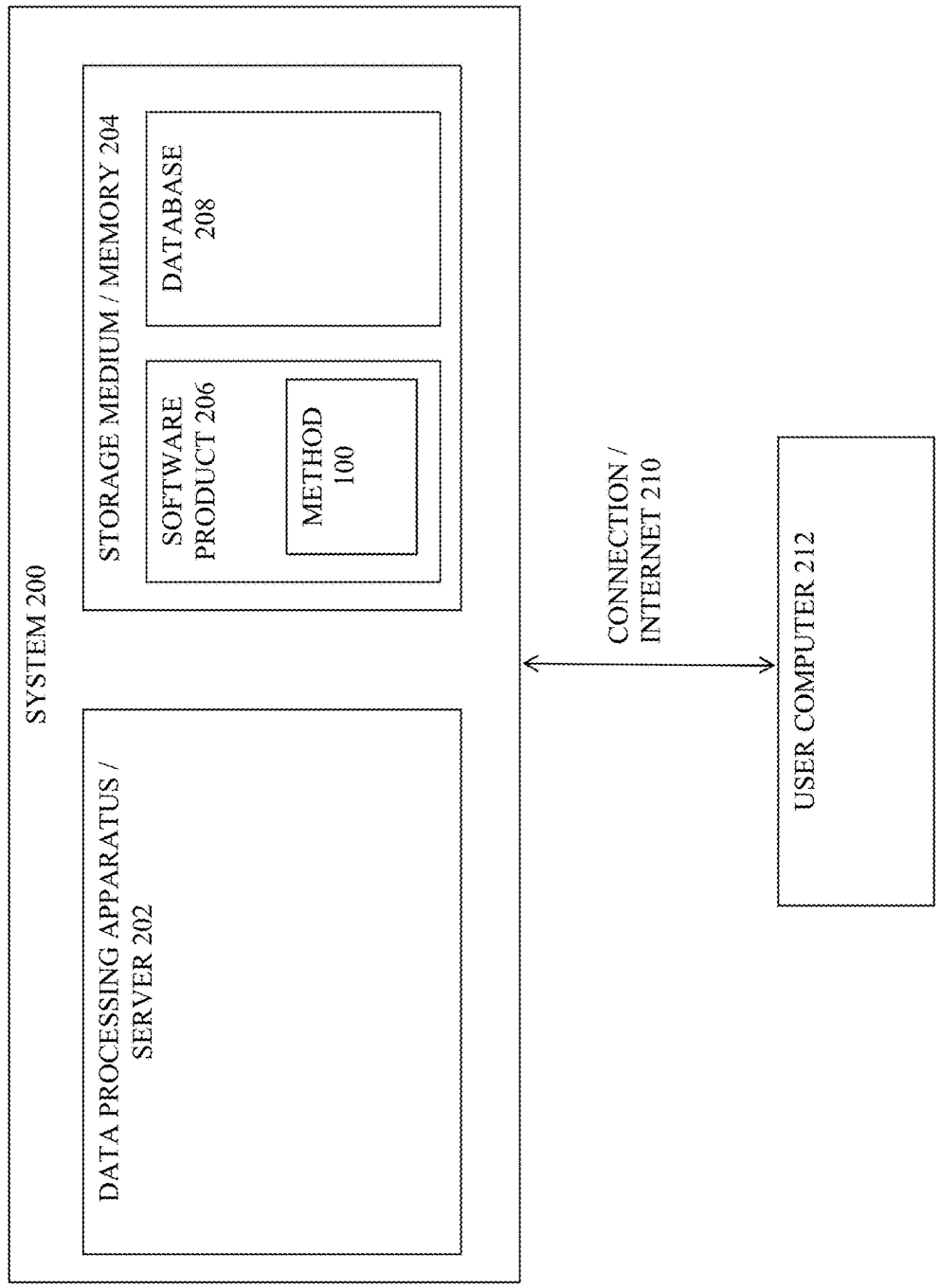
FIG. 1 is a diagram of the system of the present invention.

Referring first to FIG. 1, a diagram of system 200 of the present invention is provided. System 200 includes at least one data processing apparatus 202, preferably a server. System 200 also includes a non-transitory computer storage medium 204 encoded with computer software 206 of the present invention. Storage medium 204 also stores a database 208, which is required for some of the steps of method 100, shown in FIGS. 2-4. The computer software 206 includes instructions that, when executed by server 202, cause server 202 to perform the steps of method 100. The steps of method 100 require a connection 210, preferably via the internet, between server 202 and a computer 212 used by the user. Computer 212 may be any type of computer, including but not limited to desktop computers, laptop computers, tablets, notebooks, smartphones, etc. . . .

Communication between server 202 and the user computer 212 is preferably through Ajax. Ajax is a group of interrelated web development techniques used to create asynchronous web applications. With Ajax, web applications can send data to and retrieve data from a server asynchronously, meaning in the background, without interfering with the display and behavior of an existing page. Data can be retrieved using the XMLHttpRequest object. Ajax is not a single technology, but a group of technologies. HTML and CSS can be used in combination to mark up and style information. The DOM is accessed with JavaScript to dynamically display, and allow a user to interact with, the information presented. JavaScript and the XMLHttpRequest object provide a method for exchanging data asynchronously between a browser and server to avoid full page reloads. Although Ajax technology is preferred to affect the exchange of information between the user and server 202, any similar technology commonly used in the art may be used.

Although not shown, it is understood that the computer software product 206 of the present invention is stored on a non-transitory computer-readable medium, such as a removable disc that may be applied to a computer or a server from whence the computer software product 206 may be downloaded to a computer. Computer software product 206 stores instructions that, when read by the computer, cause the computer to perform the steps of method 100. For the purposes of this description, a computer-readable medium can be any apparatus that may include, store, communicate, propagate, or transport the instructions/steps of method 100 for use by or in connection with the instruction execution system, apparatus, or device. The medium can be an electronic, magnetic, optical, electromagnetic, infrared, or semiconductor system (or apparatus or device).

Figure 2:
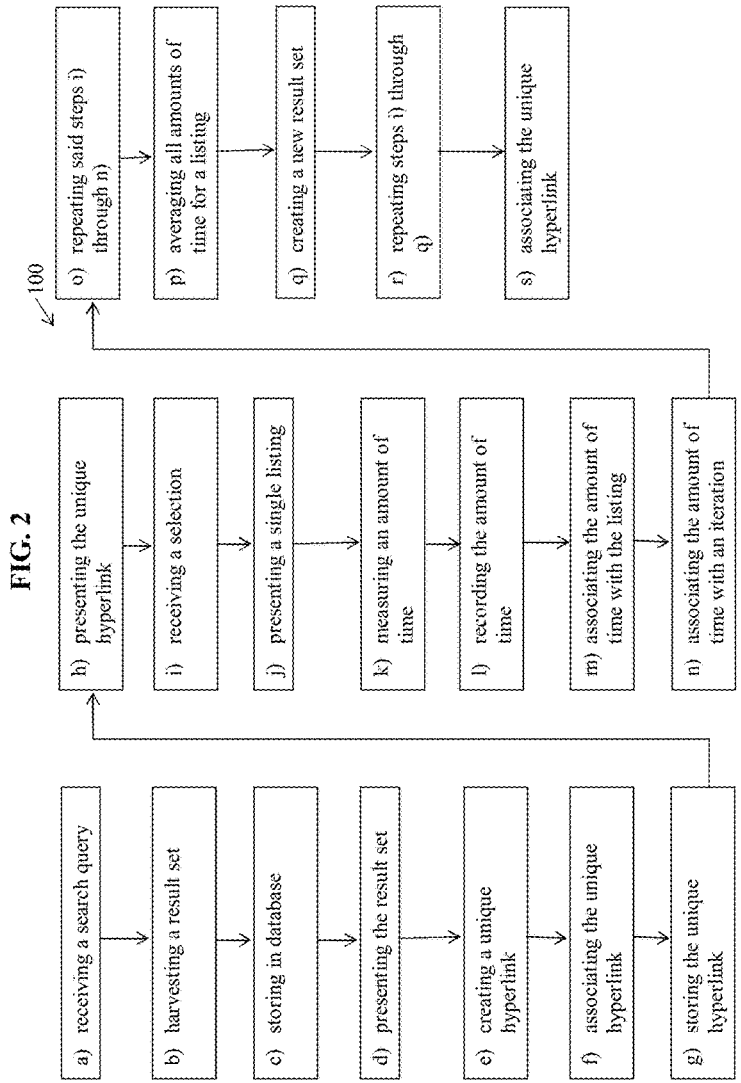
FIG. 2 is a flow chart illustrating the method of the present invention in its most basic form.

Now referring to FIG. 2, a flow chart illustrating the basic method 100 of the present invention is provided. Method 100 is a computer-implemented method for creating a hyperlink to a best listing from a search query as measured by audience interaction. The first step a) is receiving a search query from a user. This typically involves a user using a standard search field using any common search engine and submitting the search form. Upon submission, the search query and any content filtering preferences, as discussed below, are received by a server 202, preferably using Ajax.

Figure 3A:
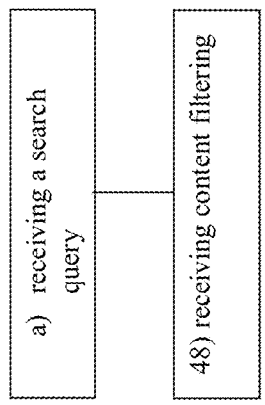

As shown in FIG. 3A, step a) preferably also includes step 48) receiving content filtering preferences associated with the search query. Content filtering preferences may include query types, which specify one or more characteristics of the search query. A query type may be, for example, images, web, video, or news. Other types of content filtering preferences may include parental controls, a limit on the number of desired results to be returned, or preferences to exclude, for example, websites with certain top level domains; websites that have not been updated since a certain date; or websites that were created before a certain date. One of ordinary skill in the art will recognize that there are many ways in which a user may preemptively filter a search query.

Figure 6A:
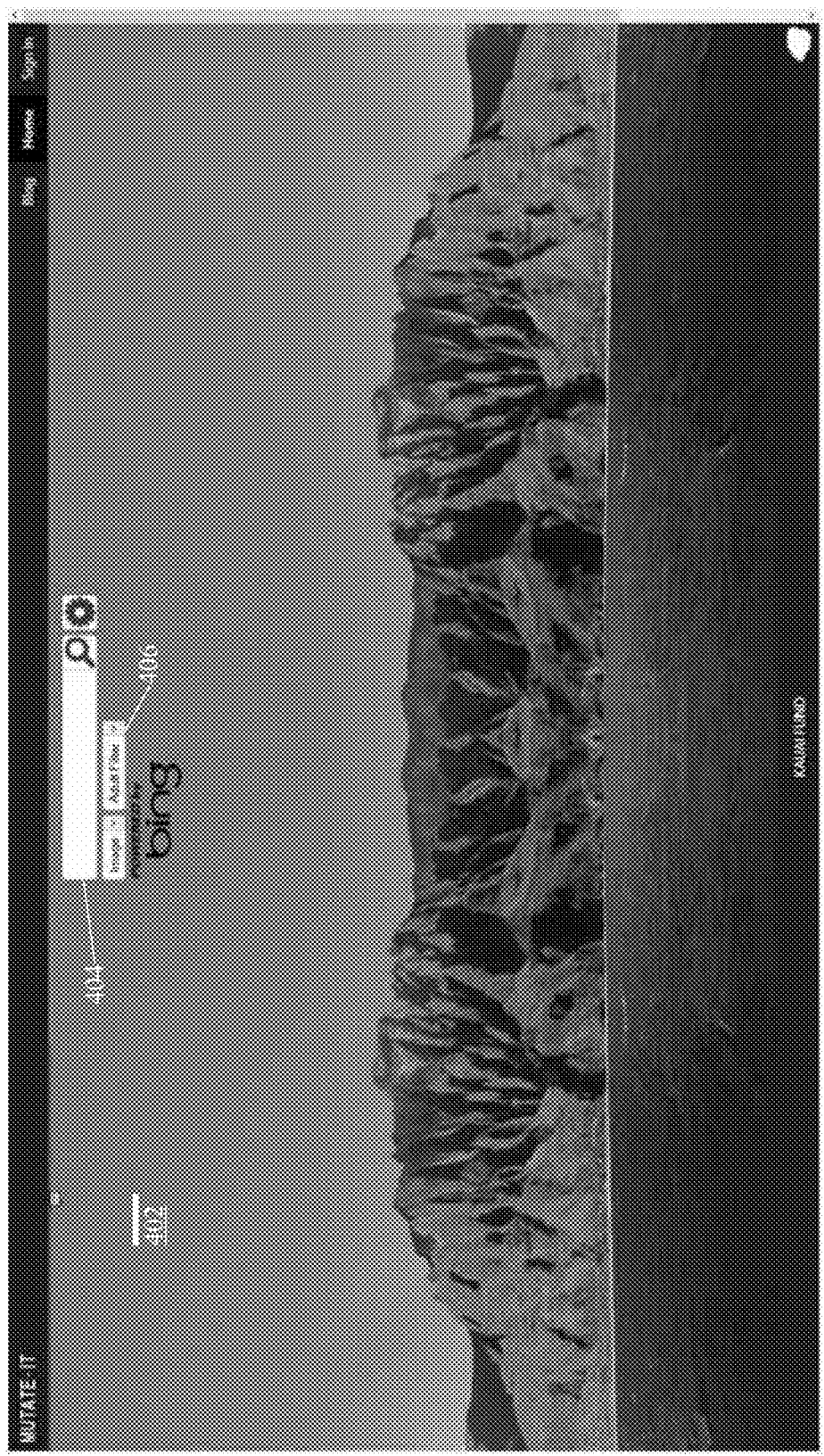
FIG. 6A is a screen shot of an exemplary user-facing front page before the method of the present invention has been performed.

FIG. 6A shows a screen shot of an exemplary user-facing front page 402. The user enters her search query into search query window 404 (step a). She may also enter content filtering preferences 406 (step 48). Here, options for content filtering preferences 406 are presented in dropdown menus. As shown, the user may select, for example, to have only images delivered in the result set and/or to have adult content removed from the result set. Other options are not shown but understood to be included in the dropdown menus.

Figure 3B:
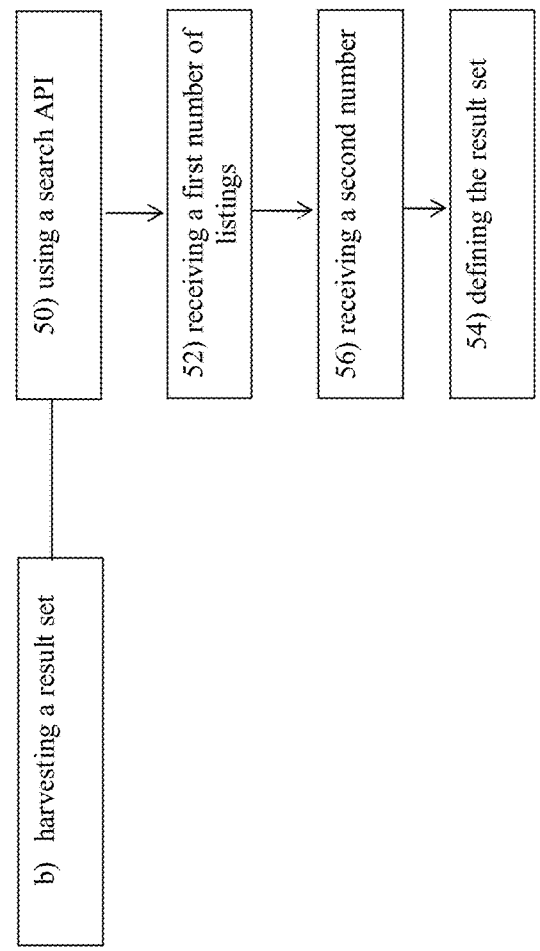

The second step b) is harvesting a result set for the search query. The result set comprises a number of listings that match the search query. It is preferred that a check is performed to ensure that an adequate number of listings are returned at this point. As shown in FIG. 3B, step b) preferably entails submitting the search query and any content filtering preferences to a common search API, such as those marketed under the trademarks BING, GOOGLE, and YAHOO BOSS, which submission causes the API to perform the harvesting. The search API returns the listings in the result set in order of relevancy determined by the specific search API's algorithms. The search API generally limits the number of listings returned in the result set. In FIG. 3B, this is step 52) receiving a first number of listings from the search API. The first number is the number of listings general returned by the search API. The YAHOO BOSS API, for example, will return the top 50 most relevant web results or the top 35 most relevant image results, in each case ranked in terms of relevancy to the search query as determined by the search API.

In preferred embodiments of the method 100, these results are further limited in number. This is represented by step 56) of receiving a second number. In step 54) of defining the result set, only the top second number most relevant listings of the first number of listings provided by the search API are included in the result set. It is preferred, for example, that only the top 10 most relevant results provided by the search API are included in the result set. In this case, 10 is the second number, or the number of desired listings in the result set.

As mentioned above, in some embodiments of method 100, the user may have included a desired number of listings included in the result set as a content filtering preference. Therefore in some embodiments, the server receives the second number from the user as a content filtering preference. When the second number received from the user is greater than or equal to the first number of listings provided by the search API, then the result set will include all of the first number of listings provided by the search API. When the second number received from the user is less than the first number of listings, then only the top second number most relevant listings will be included in the result set.

In short, the search API will return a first number of listings in the result set as set by the search API. The number of listings in the result set may then be limited by including only the top second number most relevant listings, where the relevancy was determined by the search API, and the second number may be built into the method 100 or provided by the user.

As shown in FIGS. 3C and 3D, listings that include iframe or header response code issues are removed from the result set. These steps are shown in FIG. 3C as 64) identifying listings for which an iframe issue exists; and 66) eliminating any listings from the result set for which an iframe issue exists; and in FIG. 3D as 68) identifying listings for which a header response code issue exists; and 70) eliminating any listings from the result set for which a header response code issue exists. As shown in FIGS. 3C and 3D, the steps of checking for iframe or header response code issues may occur between steps b) and c), but they may also occur continually during the measurement phases as well, so as to ensure that any listings that develop iframe or header response code issues during the measurement phases are not presented to new members. Instead, the next iframe and header response code issue-free listing will seamlessly be presented to the new member with the new member being none the wiser.

It is preferred that the listings are served via an iframe. An iframe is essentially an HTML window to view a separate webpage within a webpage. X-Frame-Options exist to prevent an internet object or source from being served in an iframe. The goal is to prevent an outside webpage from leveraging content in the listings onto the outside webpage. Although these settings are fairly rare, their presence is considered an "iframe issue" and will trigger a "flag" to eliminate the listing that includes the setting. For example, X-Frame-Options that will trigger a flag include:
['X-Frame-Options']=='DENY'
['X-Frame-Options']=='SAMEORIGIN'

The same principle applies for specific header response codes. The header response codes are associated with each listing. Certain header response codes indicate that the listing is essentially unusable, generally because it cannot be found or no longer exists. Listings associated with such header response codes have a "header response code issue" and will trigger a flag to eliminate that listing. Header response codes that will trigger a flag include:
0=>'Domain Not Found',
100=>'Continue',
101=>'Switching Protocols',
102=>'Processing the request',
103=>'Aborted PUT or POST Request',
122=>'URI is longer than a maximum of 2083 characters',
300=>'Multiple options for the resource delivered',
301=>'This and all future requests directed to the given URI',
302=>'Temporary response to request found via alternative URI',
303=>'permanent response to request found via alternative URI,
304=>'Resource has not been modified since last requested',
305=>'Content located elsewhere, retrieved from there',
306=>'Subsequent requests should use the specified proxy',
307=>'Connected again to different URI as provided',
308=>'Connect again to a different URI using the same method',
400=>'Bad Request',
401=>'Unauthorized',
402=>'Payment Required',
403=>'Forbidden',
404=>'Not Found',
405=>'Method Not Allowed',
406=>'Not Acceptable',
407=>'Proxy Authentication Required',
408=>'Request Timeout',
409=>'Conflict',
410=>'Gone',
411=>'Length Required',
412=>'Precondition Failed',
413=>'Request Entity Too Large',
414=>'Request-URI Too Long',
415=>'Unsupported Media Type',
416=>'Requested Range Not Satisfiable',
417=>'Expectation Failed',
500=>'Internal Server Error',
501=>'Not Implemented',
502=>'Bad Gateway',
503=>'Service Unavailable',
504=>'Gateway Timeout',
505=>'HTTP Version Not Supported'

It is understood that when reference is made herein to a listing being "removed" or "eliminated" from the result set, in actuality the listing may not be removed entirely from the database, but rather flagged and moved to a different section of the database. As discussed throughout, this "removal" or "elimination" may be for technical reasons such as iframe or header response code issues (see, e.g. FIGS. 3C and 3D, and accompanying text); the user choosing not to include one or more listings (see, e.g. FIG. 3E, and accompanying text); and generally during the filtering iterations as listings are filtered out of consideration. The flagged listings may be stored because they are potentially helpful in identifying trends, such as what is not attractive in a listing, as opposed to what is attractive that carries a listing to a next round of filtering, or how and why a user is choosing certain listings to take out of consideration of a result set. In some embodiments, however, "filtering," "removing," or "eliminating" do mean that the listing is removed from the database. Such embodiments minimize server load, but eliminate the possibility of further analytics on filtered listings.

The third step c) is storing the search query, the result set, and each listing of the result set in database 208 stored on server 200 or the hard drive of a computer executing the steps of method 100, in the case of the computer software 206 of the present invention. The fourth step d) is presenting the result set, including each listing, to the user. Step d) involves sending the result set to the original user-facing front page.

Figure 5:
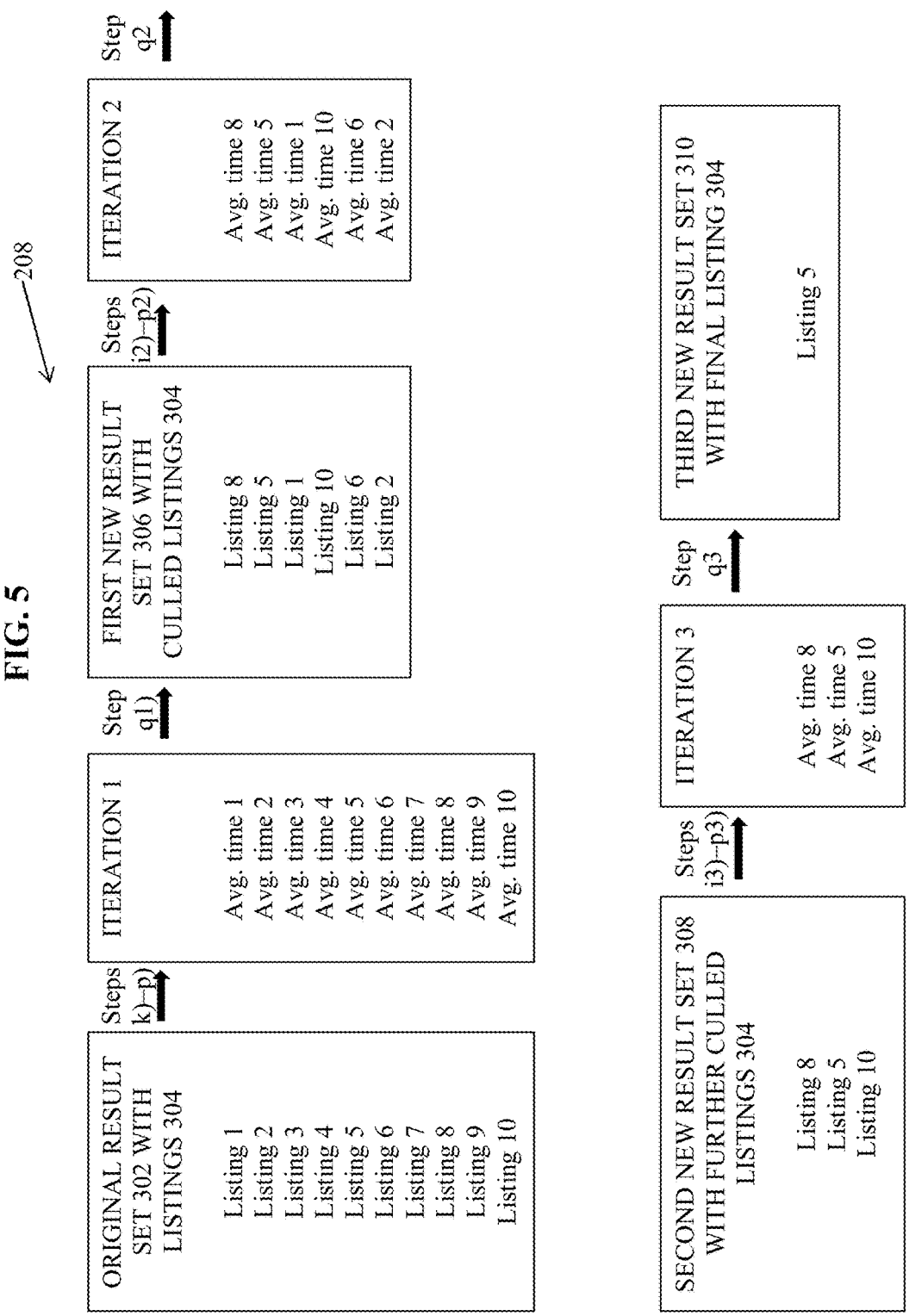
FIG. 5 is a diagram of the database through the preferred filtering method shown in FIG. 4.
Figure 6B:
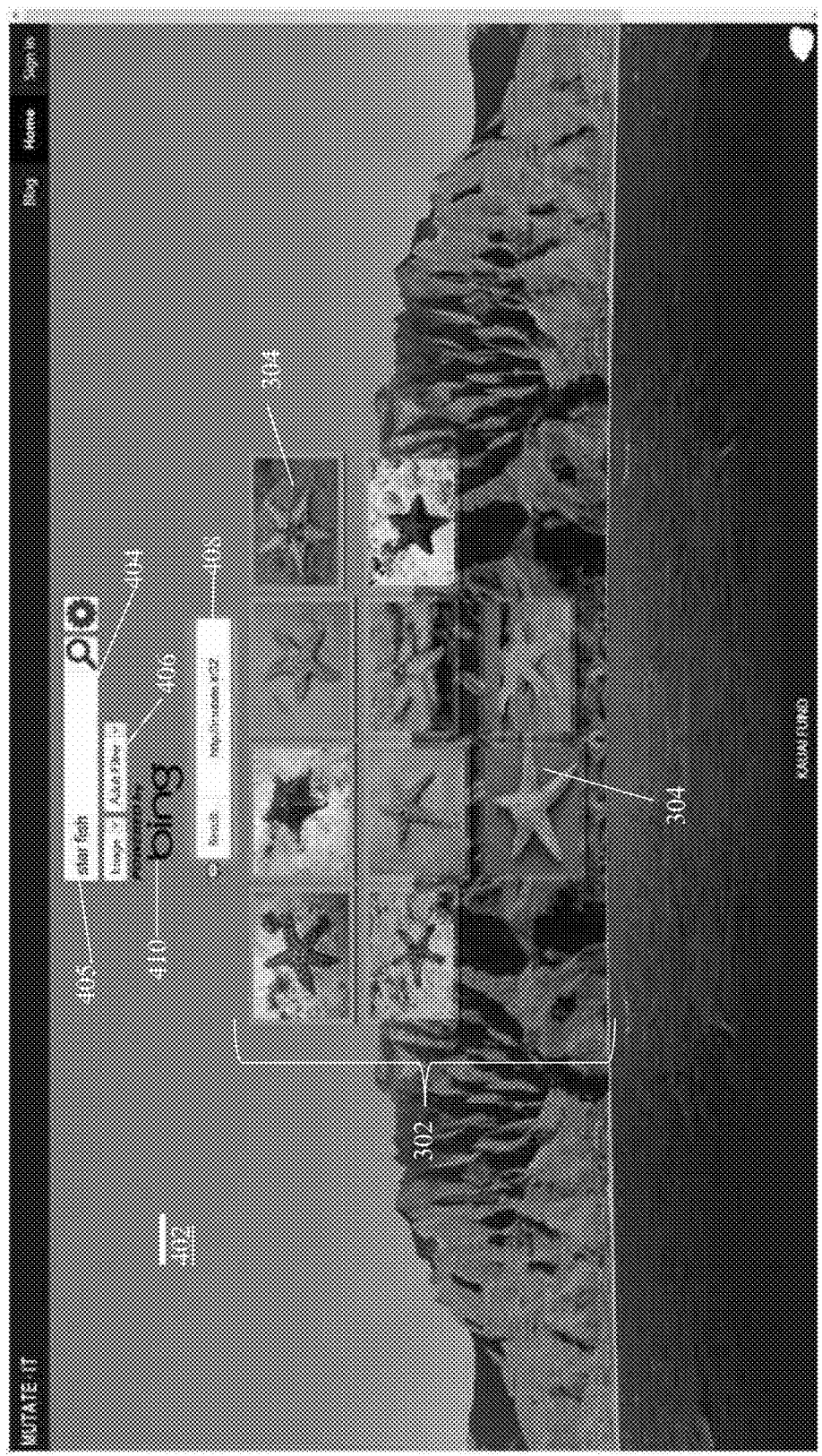
FIG. 6B is a screen shot of the user-facing front page after step h) of the method has been performed.

FIG. 6B shows a screen shot of front page 402 at this stage in method 100. The user has entered the search query 405, "star fish," into search query window 404, with content filtering preferences 406 that the result set 306 include only images and no adult content (steps a and 48). The search API 410, in this case the search API marketed under the trademark BING, has returned a result set 302 (steps b and 50) of ten listings 304, each of which is a different image of a star fish. The search API 410 may have returned more than ten listings 304 (step 52), but only the top ten (step 56) most relevant listings 304 are included in this original result set 302 (step 54). Unique hyperlink 408 has been created and associated with the search query 405 and result set 302 (steps e and f). Although many of these steps are listed separately and sequentially, it is understood that in practice, many of these steps occur simultaneously or almost simultaneously. Listings 304 that have been eliminated because they had iframe or header response code issues are not included in result set 302 (steps 64, 66, 68, 70). Instead, if iframe or header response code issues existed, the next most relevant listing 304 have been moved up to join result set 302. This original result set 302, including listings 10, and the unique hyperlink 408, have now been presented to the user (steps d and h). This screen shot corresponds with the top left box of FIG. 5, discussed below, as well as FIGS. 3A-3D, discussed above.

As shown in FIG. 3E, the user may reduce the result set at this point by selecting certain listings to be eliminated from the result set. The steps in this process include 58) receiving direction from the user regarding certain listings within the result set to be removed therefrom; 60) removing the specified listings from the result set; and 62) redefining the result set as the result set with the specified listings removed. This feature allows the user to ensure that all listings included in the result set are relevant for whatever the user's specific goal may be. Search APIs and their relevancy rankings do not always return search results that are on point or sufficiently eliminate outliers. This feature would allow the user to ensure that all listings in the original result set are on point before submitting the result set to the remainder of method 100. In short, it allows the user, to an extent, to make sure that when the various listings are compared against one another as far as the time measured viewing them, that apples are being compared to apples.

The fifth step e) is creating a unique hyperlink for the result set. This unique hyperlink will be selectable or clickable by new members through the internet, as discussed below. In the sixth step f), the unique hyperlink is associated with the search query and the result set within the database 208. In the seventh step g), the unique hyperlink is stored in the database 208. It is understood that in practice, steps e) through g) are performed simultaneously. In the eight step h), the unique hyperlink is presented to the user. These steps e) through h) are effectively performed using the Ajax technology discussed above.

The next step in the method is not performed by system 200. In the next step, the user distributes the unique hyperlink 408 through a channel or medium on the internet. The unique hyperlink 408 is distributed and used in the same way as any regular hyperlink may be distributed and used. The user might distribute the unique hyperlink 408 in any number of ways, such as via the social media services marketed under the trademarks FACEBOOK, TWITTER, LINKEDIN, REDDIT or DIGG. She also might email it or include it in a blog post. The mutating links service incorporates an open graph protocol to assist standard social media sites with additional contextual information. For example, with a mutating link posted on the FACEBOOK service, the open graph protocol will provide the mutating link post with a title and description, along with the listing posting. Flexibility of distribution channels is critical in allowing the user base to develop additional uses for the mutating link service. From here on in the method 100, the unique hyperlink 408 may be truly considered a "mutating link" because, as discussed in more detail below, during the execution of method 100, the result of clicking on the unique hyperlink will not be the same for every person who clicks on the link every time they click on it.

The mutating link is intended to leverage the influence of the context in which the link was posted. Therefore instead of internet users at large, the user selects a small subset of internet users, such as her FACEBOOK friends, LINKED colleagues, or fellow baseball fans included in her MLB fans mailing list. The nature of the audience to whom the user distributes the mutating hyperlink will therefore influence the final result of the method 100, as discussed below. For example, a conspiracy blog that posts a mutating link based on the news query for "drones" may likely resolve to news stories covering government abuses of drone technology, while a farming blog that posts a mutating link based on the news query for "drones" may likely resolve to news stories covering the benefits of planting crops. As a side note, the drastically different contexts of the term "drones" here illustrates the utility of the embodiment of the method including the steps discussed above with respect to FIG. 3E. I.e. the user who is a conspiracy blogger and begins method 100 by submitting the news search query "drones," may, once presented with the result set (step h), go through the listings before distributing the unique hyperlink on her conspiracy blog, to ensure that each news story listing has to do with governmental use of drones or something relevant to her blog, rather than news stories about drones helping with planting crops.

A variation on this type of distribution is illustrated in FIG. 3F, in which method 100 further includes the steps of 82) receiving a direction from the user specifying at least one characteristic of a set of new members to whom the unique hyperlink will be sent; 84) receiving a direction from the user to send the unique hyperlink to a set of new members that have that characteristic; and 85) distributing the unique hyperlink to that set of new members on the user's behalf. In this variation, after the result set is presented to the user (step h), instead of the user distributing the unique hyperlink herself, she indicates that she wants the system 200 or server 202 to distribute the unique hyperlink (step 84) to a set of new members that are not chosen or determined by the user. In a sub-variation, she also sends a direction regarding at least one characteristic of a desired set of new members (step 82). For example, the user might be trying to decide which image of the Sydney Opera House is the most desirable to include in her luxury travel blog. She might therefore request that her unique hyperlink be sent to a set of new members who have indicated an interest in travel and that earn incomes in a specific tax bracket.

In other words, a core set of new members may be on standby to consider listings from the user's result set. This variation goes against a basic tenet of the present invention, which is to passively harvest data on how interesting or attractive a certain listing is because the audience does not know their viewing time is being measured. A core audience that is aware of method 100 knows that its time is being measured and could therefore skew the results by viewing a certain listing longer than they normally would. Assuming the core audience is instructed not to purposefully unduly affect the results by looking longer at a listing than they normally would, however, this feature could be useful in a few contexts. The feature might, for example, be useful in providing a sampling audience to guide content selection before the content is incorporated into content, such as the above example with the Sydney Opera House image being tested before being incorporated into the blog. Another consideration with this feature, however, is that the use of a core audience for this purpose would disassociate the mutating link from the content into which it was embedded. This detachment would mean the remainder of the blog content in which the link would normally be shared would have no influence on the audience's perception and determination of the final listing, for example. Understanding such drawbacks, however, the user would have the option to use this feature.

The feature may also be beneficial in situations, such as described in the following two examples: First, the service could scrape the top trending results per a day from the internet and generate news based query links for each result. An example might be several mutating links to news stories based on queries such as "ISIS" and "Ebola." This would essentially amount to a self-determining daily news source. Each day the resource would scrape the top stories and the mutating links would leverage the core audience to resolve to the best/most informative source. A content provider user with a specific political slant could run a particular set of mutating links through a core audience with a specific political view to help determine the sources the content provider will ultimately show, share, and emphasize in its content.

Second, the service could emulate sites within sites based on common interests. For example, a more general information website may have a specific sub-website geared specifically toward an audience interested in science stories and information. Using mutating links, users could submit their particular query to that sub-website with its specific built-in audience. This would provide two benefits. First, viewers interested in the particular subject would have fresh content to consume based on queries spun off by other users. Second, as discussed above, a user could pretest the mutating link against a particular audience before using the winning result in their own content.

Once the user has distributed the unique hyperlink 408, method 100 continues with the ninth step i) of receiving a selection of the unique hyperlink from a new member. In other words, a new member has received the unique hyperlink from the user's distribution, whatever the form of that distribution may have been, and clicked on it.

As shown in FIG. 3G, additional steps following step i) allow only one time measurement per IP address. It is understood that the one time measurement per IP address is for each result set. A new member using a specific IP address may participate in any number of mutating hyperlinks for different result sets. These steps include 72) identifying the IP address of the new member who selected the hyperlink; 74) associating the IP address with the unique hyperlink in the database; 78) determining if the IP address is the same as any others that are associated with the unique hyperlink in the database; and 80) presenting a listing to the new member. If it is determined that a new member with the same IP address has already selected the hyperlink, then as stated in step 80), the new member with that repeated IP address will be presented with a listing, but the remainder of the method 100 will not occur. I.e. the time spent looking at that listing is not measured or factored into the algorithm, as discussed below. In addition, the listing that was presented to that new member with the repeated IP address will not count as having been presented for purposes of the algorithm. For example, if the algorithm being used requires that each listing of the result set be viewed and measured once, then the listing will be presented to a different new member with an unused IP address, just as though the listing had not been presented to the new member with the repeated IP address. As such, step j) will occur after this IP address check just as though that listing had never been presented to the new member with the repeated IP address, and this presentation will not count toward the requirement in step o) that the listing presented in step j) is varied until each listing of the result set has been presented to a new member at least once. This feature reduces the likelihood that a single new member could unduly influence or manipulate the results of method 100. On the other hand, this feature may not be preferred. Adding this feature creates greater server load. Whether or not to include this feature, therefore, is a tradeoff between server load versus having the data and determining how viewers are behaving.

The tenth step j) is presenting one of the listings from the result set to that new member that just clicked on the unique hyperlink. The new member only sees the unique hyperlink in the context in which the user provided the unique hyperlink to the new member. The new member has no idea that they have just clicked on a mutating hyperlink that when selected by a different person might produce a different listing. If the new member were informed about the mutating link, he could potentially rig the system to promote one listing from the result set over another by, for example, keeping the listing up for much longer than he would normally view it. The intent of mutating links is to keep the interaction passive. If a listing is interesting, the new member will naturally spend more time observing it than if a resource is off base, uninformative, or boring. Given this emphasis on passive interaction there is no intention to provide instructions regarding the mutating links to the new members.

It is preferred, however, that the listing be presented to the new member on a staging page within the mutating links application. This will not indicate anything in particular to first time new users, so measurement times would not necessarily be skewed because the first time new member would not know how the mutating links service operates. Using the staging page within the mutating link application may serve to educate the public as to the existence of the mutating link service, thus increasing its user base. In addition, using the staging page within the mutating link application makes step k) of measuring the amount of time a new member views a listing a much easier step to perform. Using the staging page does have the drawback, however, that new members to whom other unique hyperlinks have been sent in the past may recognize the staging page and know that their viewing time is being monitored. This knowledge could allow them to skew the results against or in favor of the listing that has been presented to them by spending less or greater than the amount of time they would normally have spent viewing that listing.

The eleventh step k) is measuring the amount of time the new member spends viewing the listing presented to him upon selecting the unique hyperlink. This is a measurement of time between when the webpage including the listing loads in front of the new member and when the new member closes that webpage. As discussed above, it is preferred that the listing be presented in a webpage controlled by the mutating links application so that this measuring step may be more easily performed. In order to avoid undeservedly high measurement times, it is preferred that the action of the new member clicking on a hyperlink embedded in the listing indicate that the new member has ceased viewing the listing, thus turning off the clock, as far as measuring the viewing time. Specifically, changes in the source attribute of the iframe in which the listing is presented are monitored so that if the new member has clicked into another hyperlink embedded in the listing, this is detected. In the case that a change in the source is detected through the monitoring, then the time measurement for that listing is halted. This is based on the assumption that a change in the source being served is likely the result of the new member navigating to a different resource inside of the iframe, which ultimately may not be connected to the originally presented listing, and therefore time spent viewing this new source should not contribute to the listing's likelihood of being selected as the best-fit listing or at least to move on within the filtering.

The twelfth, thirteenth, and fourteenth steps are l) recording the measured times in the database; m) associating the amount of time with the listing that was viewed for that amount of time; and n) associating that amount of time with an iteration in the database. The iteration is numbered as "iteration n," where n is an integer. Generally, the first iteration of presenting the listings and measuring the time spent viewing them is considered to be iteration 1 or the first iteration. As the listings in the result sets are gradually filtered, the iteration numbers will increase, as discussed below.

The fifteenth step is o) repeating steps i) through n), where each time a new member selects the unique hyperlink, a different listing from the result set is presented to him until each listing from the result set has been presented to a new member at least once. In some embodiments of method 100, step o) is continued, and the listing presented in step j) is continually varied and presented, until each listing of the result set has been presented a statistically significant number of times. Statistical significance is the low probability of obtaining at least as extreme results given that the null hypothesis is true. In the present case, there is always the possibility that measured times would have occurred due to sampling error alone, rather than the measured times indicating interest in the listing and/or suitability of the listing in its context, which are the aspects trying to be measured by measuring the time spent viewing the listings. The larger the sample size, i.e. the more times viewing times of a particular listing are measured, the more likely that the measured times are actually indicating interest/suitability rather than merely being a sampling error. The statically significant number will vary based on the number of listings in the result set and the p-value of statistical significance that is set to determine the null hypothesis. Generally speaking, however, requiring statistical significance means that the listings will be presented a much larger number of times so as to garner a larger sampling size for analysis.

The default measurement algorithm discussed below is not based on statistical significance. The default measurement algorithm balances delivering an informed estimate in a time frame that will satisfy most users. Users that opt to incorporate the feature described above of repeating steps i) through n) many times until a statistically significant sampling has been gathered will need to be more patient than the average user, as collecting that data will take much longer than collecting the data for the default measurement algorithm. The default measurement algorithm, which determines the cadence and order of how the listings are presented, is designed to generate exposure across all of the listings and actively filter listings from the result set with low viewing times across multiple new member viewings. As the listings in the result set gain an adequate amount of exposure, as determined by the algorithm, listings with high viewing times are advanced further into later iterations of measurement.

While the default measurement algorithm does require that each listing has a certain number of views in order to determine the best-fit listing, this number is preferably not preset. The final new member count is determined by how the algorithm plays out across the new members. As described in more detail with reference to FIGS. 3 and 4, an iteration, or round of filtering, is intended to be defined as running through and measuring each listing that is still being considered in the result set. For example, with a fresh mutating link, all listings are still in consideration. The first iteration can only be complete once all listings have either been presented and measured, or ruled out as part of the iframe/header check process or otherwise. The second iteration can only be completed once all of the listings below one standard deviation or above the average have been presented or a flag has been generated. As a note of complexity, some of the measurements used to refine each iteration are moving targets. For example, the average time is adjusting as each new listing is viewed. This practice means the number of listings being considered for a particular iteration might grow or shrink during the sampling for that iteration. I.e. the average might drop and a new listing might make the cut towards the end of that iteration. Moreover, one mutating link may result in a first iteration sample with only one outlier less than one standard deviation that will be given a fresh chance in the second round, whereas another may include several underperformers that are retested. The same reasoning applies to one listing that has a distribution with a few severe underperformers bringing down the average, resulting in more listings being tested because more listings are above the average, versus a listing with a more even distribution and a smaller set of listings above the group average that continue to further testing rounds. While there is some variation to be expected in terms of the number of time measurement samples required to determine a winning result, the variance in required samples between to different links should be relatively minimal.

The sixteenth step is p) for each listing, averaging all amounts of time associated with that listing. It is understood that when steps i) through n) were only repeated enough times so that each listing was presented to only one new member, then the "average" for that time, as determined in step p), is the single measured time for that listing. If, on the other hand, steps i) through n) were repeated enough times that each listing was presented more than once, then the measured times for each time a particular listing was presented are averaged to determine an average time for that particular listing.

As shown in FIG. 3H, in some embodiments of method 100, additional steps are taken between step o) and step p) to address listings with unduly high average times. The additional steps are 86) identifying a high measured time as a measured time for a listing that is greater than one standard deviation higher than an average measured time across all times for that listing; 88) normalizing that identified high time; 90) replacing the high time for the listing with normalized time; and then moving on to perform step p) but using the normalized time in the averaging, rather than the high time. The mutating links service generally relies on determining and resolving to high outliers, but a new member could potentially rig the algorithm by spending an inordinate amount of time on a single listing in an attempt to dictate the best-fit listing to the algorithm. This feature would identify such extreme outliers and somewhat normalize them, so as to remove undue influence over the result set from a single new member, while still maintaining the listing as a having a high average time.

Another method of normalization would be to determine the standard deviation of all of the listings above the average and then determine the listings from this subset that are greater than one standard deviation above the average of the subset. These results could then be handicapped by reducing their individual variance greater than the group's standard deviation by half. This would maintain their relative standings, but reduce an individual new member's influence. One of ordinary skill in the art will recognize that there are many ways in which high outliers may be normalized so that those listings are still ranked highly, but do not skew the algorithm unduly in their favor.

The seventeenth step is q) creating a new result set from the listings of the result set. This new result set includes at least the listing with the highest average time and filters at least one other listing. In basic embodiments of the method, the at least one listing that is eliminated is that with the lowest average time. In some embodiments, however, such as in certain iterations of the preferred method described below with reference to FIG. 4, listings with the lowest average time are not necessarily those that are always filtered. The eighteenth step is r) repeating steps i) through q) until that new result set created in step q) includes only one listing, and increasing the iteration number each time step q) is performed. If, in the first time step q) is performed, all listings but the listing with the highest average time are eliminated, then step r) is null and not performed. Otherwise, however, as one of ordinary skill in the art will recognize, there are many ways in which steps q) may be performed to gradually filter the listings down to the one best-fit listing.

The preferred method of performing steps q) and r) is described below with reference to FIGS. 4 and 5.

Figure 4:
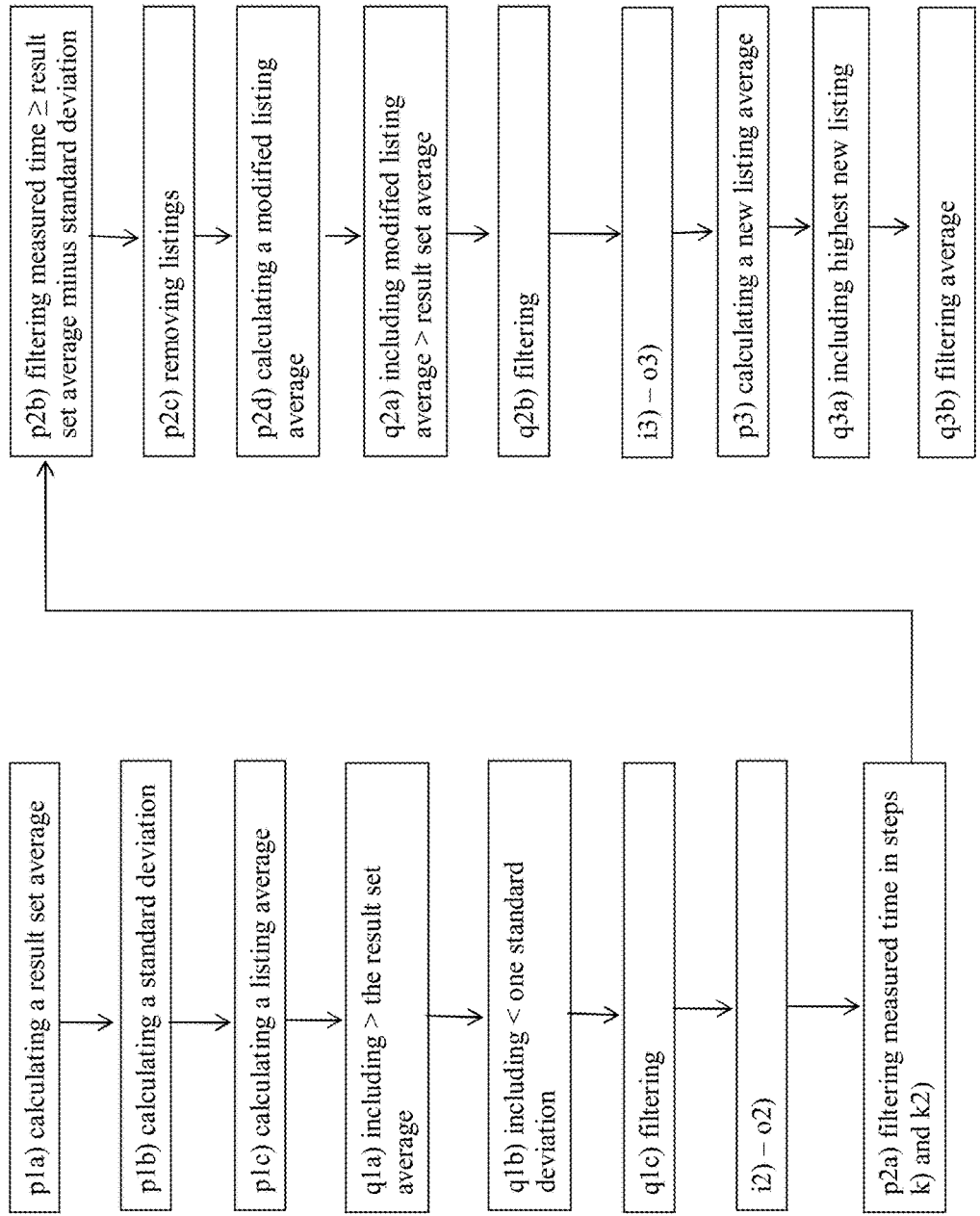
FIG. 4 is a flow chart illustrating the preferred filtering method of the present invention.

Now referring to FIG. 4, the preferred method of steps p) through r) is illustrated in a flow chart. To be clear, in the steps about to be described, steps a) through o) have already been performed once. In step n), the iteration was set at iteration n, where n is an integer. We will consider n to be 1, so that this will be considered the first iteration, or round of filtering, in the method. In step o) of the preferred method, each listing has been viewed not "at least once," but exactly once.

Step p1) is the first time step p), averaging all amounts of time associated with the listing, is performed. In this preferred method, step p1) includes each of the following steps: p1a) calculating a "result set average," which is the average time across all iteration measurements across the entire result set; p1b) calculating a standard deviation of the result set; and p1c) calculating a "listing average," which is an average of all iteration times for a single listing. Note, as each listing has only been viewed once per step o) discussed above, the listing average calculated in step p1c) is the single time measured for that listing at this point in the process.

Step q1) is the first time step q), creating a new result set, is performed. Step q1) is creating a first new result set from the original result set. Step q1) is performed by the following steps: q1a) including in the first new result set those listings whose listing average, as determined in step p1c), are greater than the original result set average, as determined in step p1a); q1b) also including in the first new result set those listings whose listing average as determined in step p1c) are less than one standard deviation below the original result set average, as determined in steps p1a) and p1b); and q1c) filtering all other listings from the original result set that do not meet either of those criterion. This filtering step q1c) does not necessarily completely eliminate the filtered listings from consideration, but they will not be presented in the second iteration, as discussed below. Rather, the filtered listings are retained in the database but not included in the first new result set. As averages are across all measured results, including those that have been filtered, if a subsequent iteration garners very low measurements that bring averages low enough, previously filtered results may be reintroduced into presentation in later iterations, as discussed below. This explanation of "filtering" versus "eliminating" results is applicable to filtering steps discussed below as well. Step q1b) is a check to catch listings that may deserve to move into the next iteration, but have been unduly influenced by new members possibly trying to rig the system against the listing or new members who only fleetingly surf through the Internet, and the listing in this specific case. The balance for this possibility is to resample these low outliers, at least after the first iteration, giving them a "fair shake" before potentially being ruled out later in the process.

The process described above for iteration n=1, is reinitiated for each new viewer or iteration. This reevaluation process enables shifts in the key drivers, such as the result average and the result set standard deviation, to effectively qualify or disqualify listings to be served in iteration n=1 as the key drivers/filters shift.

Then steps i2) through o2) are performed. The "2" indicates that this is the second time that steps i) through o) are performed in the preferred method. In step n2), the iteration number is increased, so that we are now in the second iteration. In this second iteration, step p2) includes the following steps: p2a) filtering the listings to consider only those that have two measured times from steps k) and k2); p2b) filtering those listings determined in step p2a) further to consider only those who have at least one measured time from step k) and/or k2) that is greater than or equal to the result set average (determined in step p1a)) minus the result set standard deviation (determined in step p1b)); p2c) removing listings that were filtered in steps p2a) and p2b) from consideration; and p2d) calculating a "modified listing average," which is the listing average considering only those times that are greater than or equal to the result set average (determined in step p1a)) minus the result set standard deviation (determined in step p1b)). For clarification, if a listing had a measured time in step k) of greater than the (result set average−result set standard deviation), and a measured time in step k2) of less than the (result set average−result set standard deviation), then that listing's modified listing average is the k) measured time divided by 1. In other words, the low time in k2) is not considered in determining the modified listing average. Alternatively, if the listing's measured times in both k) and k2) were greater than (result set average−result set standard deviation), then the listing's modified listing average would be [k) time+k2) time]/2.

Step q2) is creating a second new result set from the first new result set. This is the second time step q) will have been performed in the preferred method. Step q2) is performed by the following steps: q2a) including those listings whose modified listing average determined in step p2d) is greater than the result set average determined in step p1a); and q2b) filtering all other listings.

The process described above for iteration n=2, is reinitiated for each new viewer or iteration. This reevaluation process enables shifts in the key drivers, such as the result average and the result set standard deviation, to effectively qualify or disqualify listings to be served in iteration n=2 as the key drivers/filters shift.

Then steps i3) through p3) are performed. These are the third times these steps have been performed, and we are now in the third iteration. In step p3), the listing average for each listing is calculated using its times measured in step k), step k2), and step k3). Step q3) is creating a third new result set from the second new result set. Step q3) is performed by the following steps: q3a) including only the listing with the highest listing average, as determined in step p3; and q3b) filtering all other listings from the second new result set. This final and only listing in the third new result set is the best-fit listing. In step s), the unique hyperlink will be permanently associated with only this last listing. In some embodiments, in step q3b) all other listings are actually eliminated, rather than merely filtered to a different part of the database, as explained above. Most APIs do not allow caching, so elimination of non-winning listings may be necessary at this point in the method 100.

Now referring to FIG. 5, a diagram of what is stored in the database 208 as the preferred method 100, described above with reference to FIG. 4, proceeds. We begin with the original result set 302 with ten listings 304. Steps k) through p) are then performed so that we have an average time for each listing 304, and we are in iteration 1. At this point, the original result set 302 is fully measured. Step q1) is then performed, filtering them into the first new result set 306. As mentioned above, "filtering" does not necessarily mean elimination. Listings 8, 5, 1, 10, 6, and 2 each had an average time greater than all of the times of the original result set 302 averaged together or were below one standard deviation of that group average. Steps i2) through p2) are then performed so that we have an average time for each listing 304 included in first new result set 306, and we are in iteration 2. Step q2) is then performed, filtering them into the second new result set 308. The step q2) filter allows only listings 8, 5, and 10, each of which have an average time greater than the group average time, considering all times for those listing 304 in both of the first and second iterations. Steps i3) through p3) are then performed so that we have an average time for each listing 304 included in second new result set 308, and we are in iteration 3. Finally, step q3) is performed, filtering them into the third new result set 310. The third new result set 310 includes only one final listing 304, which is the best-fit listing. The final q3) filter aggregates the average times for the remaining listings 304 as recorded in all three iterations, and eliminates all listings 304 except for the one with the highest overall average time. The best-fit listing is listing 5.

The nineteenth step is s) associating the unique hyperlink with the single listing included in the final new result set. This step entails adding a record to the services .htaccess file to permanently redirect the unique hyperlink to that final listing. This redirect could also be achieved by adding a redirect to a PHP file included in the source code for the landing page, as referenced in FIGS. 3I and 6A-6D and their associated text. The redirect may also be effected by any other means commonly used in the art.

As shown in FIG. 3I, it is preferred that users be able to log into the server to view current progress 94 through method 100 and previously completed results 96 of method 100. These are the steps of 92) providing login access for the user so that she may view current progressions 94 and completed progressions 96 of method 100. In short, login access provides the user with information about previously generated results. Logging in provides the user with a personalized user-facing front page 402 that includes a history of previous fully resolved winning results, as well as actively processing results. The actively processing results include visuals of the remaining listings 304 remaining in a result set 302, 306, or 308. These are the listings determined, per the method algorithm, to still be in consideration for the final result for a particular search query 405. These features provide direct feedback to the user on the progress of their active query results and the winning results selected for their fully determined queries.

Figure 6C:
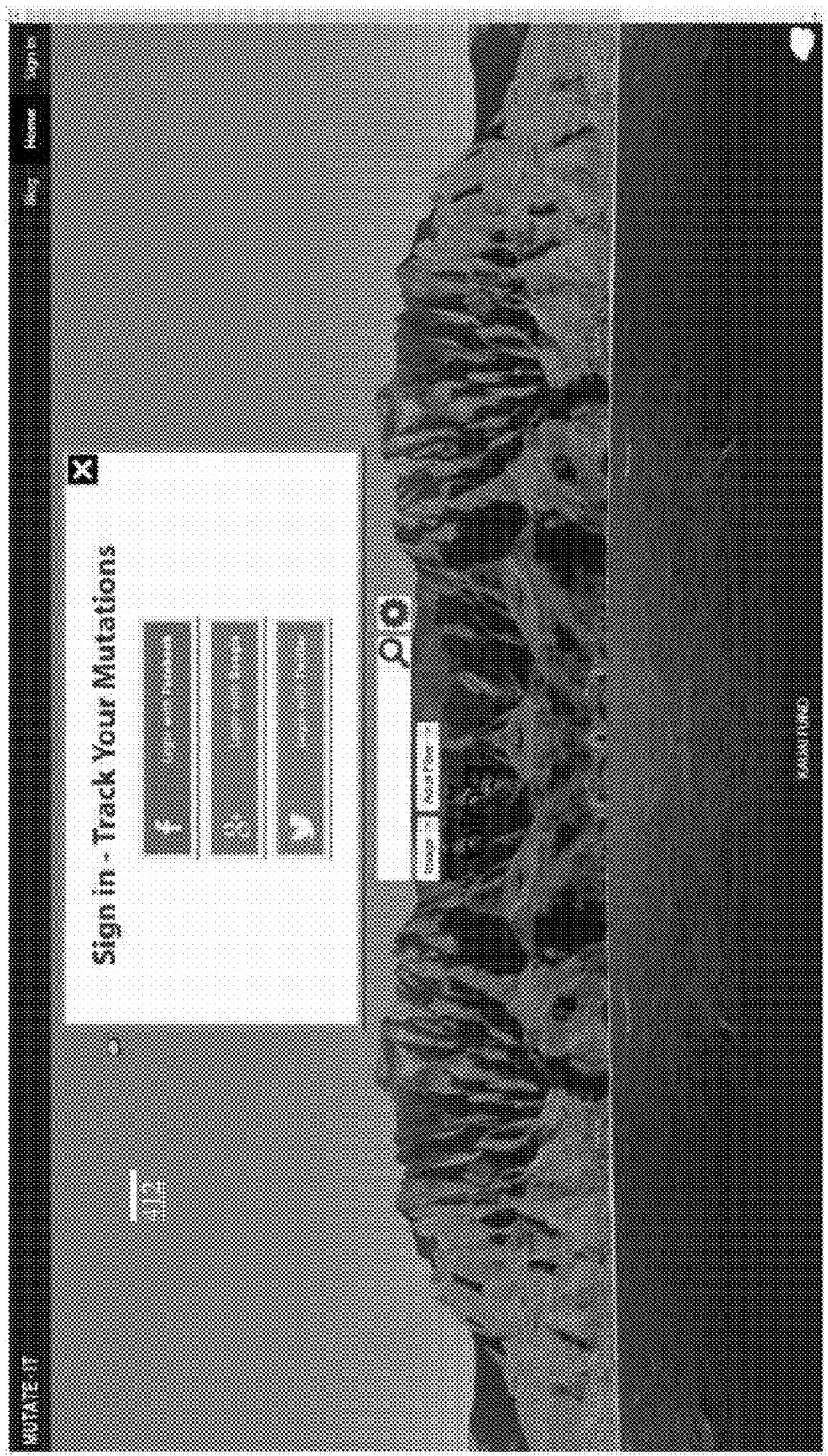
FIG. 6C is screen shot of an exemplary login page.
Figure 6D:
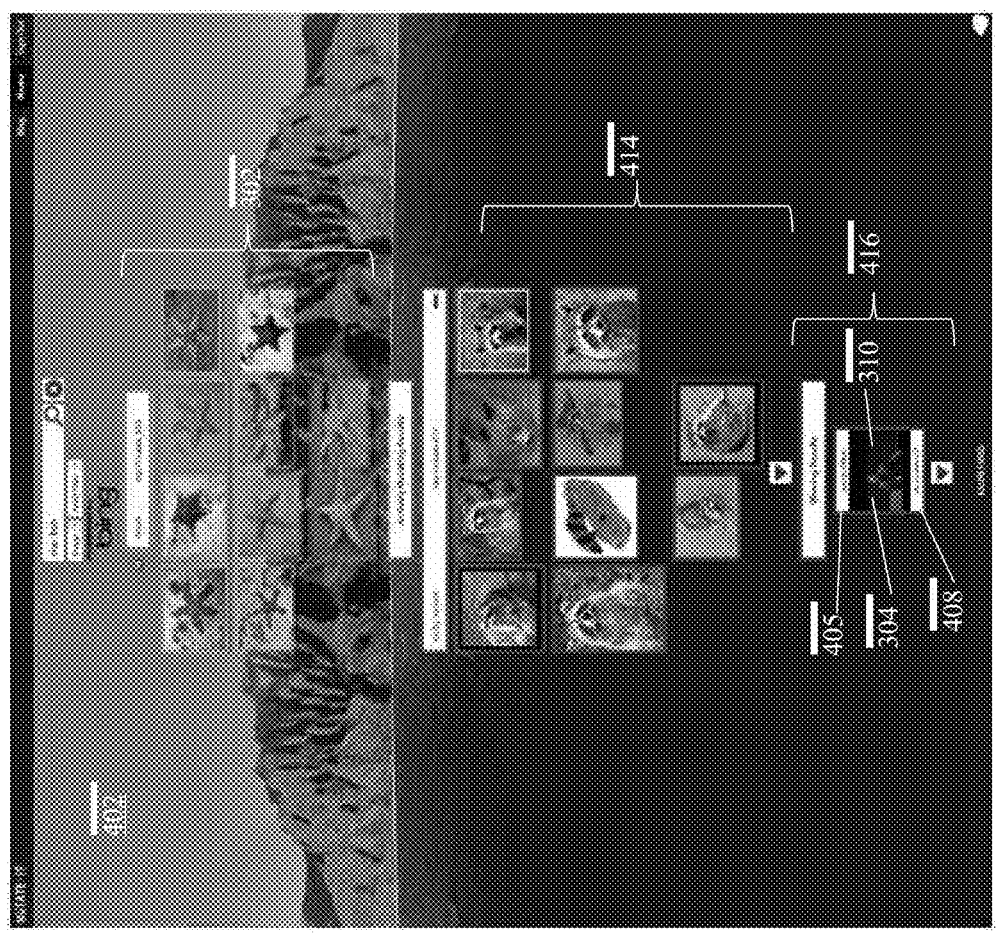
FIG. 6D is a screen shot of the user-facing front page including actively processing results and previous winners.

Now referring to FIG. 6C, a screen shot of a login screen 412 is provided. Now referring to FIG. 6D, upon logging in, a user is taken to her personalized user-facing front page 402, which will show the user her previous winners and actively processing results. At the top, we see an original result set 302 for the fresh search query 405 "star fish," as shown in FIG. 6B. This is an active progression that has not yet gone all the way through step s). For clarification, although the actual characters in the unique hyperlink remain the same throughout the mutating hyperlink process, so that new members all click on what appears to be the same hyperlink even though the listing presented to these new members throughout the process will be different, it is not until step s) that the unique hyperlink is permanently associated with only the final best fit listing. As discussed above with respect to FIG. 6B, this top portion of the personalized page represents what the user sees in a progression through step h) of method 100.

In the middle of the page, we see a progression that is mid-first iteration 414 in method 100. For clarification, although this progression is mid-first iteration 414, as discussed below, it is understood that this section in the middle of the page, the "actively mutating results" section, displays any link that has not fully resolved to a winner. The link could have zero measurements or be one measurement away from selecting a winner. We know that the progression shown has not progressed past the first iteration because all ten of the original listings 304 from the original result set 302 are still being considered. The user has distributed unique hyperlink 408 and new members are beginning to select the unique hyperlink 408 distributed to them by the user. As the new members select the unique hyperlink 408 (step i) and a listing 304 is presented to the new member (step j), the amount of time the new member views the listing 304 is measured (step k). Notice that this section is labeled "Actively mutating results." That is to say that the final result or best-fit listing for the search query is in the process of being determined. This is also an active progression that has not yet gone all the way through step s).

Although the progression shown is mid-first iteration 414, as discussed above, it is understood that if that particular progression were currently in a later iteration, fewer listings would still be displayed, as one or more filters would already have occurred, and fewer listings than those included in the full original result set would still be in contention to be crowned the best-fit. It is further understood that should a user viewing the screen shot shown in FIG. 6D refresh the page, the page will appear differently as the original result set 302 at the top or the mid-first iteration 414 grouping in the middle may have progressed to filter out one or more listings from those that are currently shown. In fact, whether the original result set 302 has progressed or not, it will be moved into the actively mutating results section upon refresh. The result set currently in mid-first iteration 414 may have progressed further or have achieved a winning status upon refresh. The actively mutating section displays any result set that has not achieved a winning status and was already in the database prior to the page loading. I.e., even if a result set has not yet registered an iteration, it would appear in the actively mutating section as long as it had been previously created prior to the page loading. Freshly queried results are dynamically added above both the actively mutating results and the winning results sections, to separate them so that a user may easily see the results and grab the new link. Unprogressed original result sets 302 are preferred to be displayed at the top of the page and fresh results are dynamically added to the page. Original result sets 302 are also preferably displayed slightly stylistically differently from other sections so that a user may easily determine a fresh result that has just been entered. If it appears to a user that a progression is "stuck," i.e. that it does not seem to be progressing and eliminating listings as it should, then this may be an indication that not enough potential new members to whom the user distributed the unique hyperlink have actually clicked on the link. The user may then decide to distribute the unique hyperlink to more potential new members, perhaps by distributing the unique hyperlink through a different means than previously, so as to help the process along by providing more people the opportunity to become new members.

At the bottom of the page, we see an example of a post-method 416 listing 304. The entire method 100 has been performed for the search query "warp drive," and listing 304 presented is the final best-fit listing for that search query 405. In other words, this listing 304 represents the entirety of a third new result set 310, as discussed with respect to FIGS. 4 and 5. Note that the original search query 405 and the unique hyperlink 408 are presented along with the third new result set 310. Once method 100 is completed, the unique hyperlink 408 will only ever bring someone who clicks on it to that listing 304. All other listings 304 originally included in the original result set 302 were eliminated during the performance of method 100.

Now referring to FIGS. 3J and 3K, it is preferred that method 100 of the present invention also includes steps for resampling. Resampling would allow for the mutating links process to be repeated periodically, either after the final best-fit result listing has been viewed a certain number of times or after a certain amount of time has passed after the final best-fit result listing has been selected through the original process. Such a resampling would ensure fresh, user-optimized content for the environment in which the mutating link appears, such as a website or blog post. The resampling process may continue ad infinitum or until the user stops the resampling or removes the unique hyperlink from its online environment.

As shown in FIG. 3J, the resampling process may include the step 117) of receiving a clicker count from the user. The clicker count is a number of times the final best-fit result listing has been selected once it has been completely filtered as described above. The clicker count may be provided by the user before the mutating link process is initiated the first time. This may be before each search query is provided by the user or it may be a user setting that she indicates as a part of her user profile, so that it is included in each mutating links process the user initiates. Having 117) received the clicker count, steps a)-r) are then performed as usual. After step r) the step 118) of counting the number of times the hyperlink is selected is performed. Upon step 120) of reaching the designated clicker count of times the hyperlink is selected, step 122) of repeating steps b) through r) again with the same search query is performed. Then step 124) of replacing the original final best-fit unique hyperlink with the new final best-fit unique hyperlink is performed.

In a variation on this resampling method, instead of the resampling being based on a clicker count, it is based on an amount of time that has passed since the original best-fit listing with associated unique hyperlink has been selected by the original mutating links process. As above, the amount of time may be provided by the user before the mutating link process is initiated the first time. This may be before each search query is provided by the user or it may be a user setting that she indicates as a part of her user profile, so that it is included each mutating links process the user initiates. The first step is 126) receiving an amount of time from the user. Again, this amount of time is the amount of time from when step r) is completed until when the user wants the resampling process to begin to select a fresh best-listing. After step r) is performed, similar to that described above, the remaining resampling steps are 128) counting time from when step r) is performed; 130) reaching the amount of time after step s) is performed; 132) repeating steps b) through r) with the same original search query; and 134) replacing the original final best-fit unique hyperlink with the new final best-fit unique hyperlink.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

I claim:

1. A computer-implemented method for creating a hyperlink to a best listing from a search query result set as measured by audience interaction, comprising the following steps of:
   a) receiving a search query from a user;
   b) harvesting an original result set for the search query, wherein the original result set comprises a plurality of listings;
   c) storing the search query, the original result set, and each listing of the original result set in a database;
   d) presenting the original result set, including each listing of the original result set, to the user;
   e) creating a unique hyperlink for the original result set;
   f) associating the unique hyperlink with the search query and the original result set within the database;
   g) storing the unique hyperlink in the database;
   h) presenting the unique hyperlink to the user;
   i) receiving a selection of the unique hyperlink from a new user different from the user;
   j) presenting a single listing of the original result set to the new user that selected the unique hyperlink;
   k) measuring an amount of time that the new user views the single listing as determined from a time when the single listing is presented to the new user and a time when the new user has stopped viewing the single listing;
   l) recording the amount of time in the database;
   m) associating the amount of time with the single listing that was viewed for the amount of time within the database;
   n) associating the amount of time with an iteration n within the database, where n is an integer;
   o) repeating steps i) through n), wherein the single listing presented in step j) is varied until each listing of the original result set has been presented to each new user that has selected the unique hyperlink at least once;
   p) in response to all listings of the original result set have been at least presented to the new user, for each listing, averaging all amounts of time associated with the listing;
   q) creating a new result set from the original result set by including at least a listing associated with the highest average amount of time and filtering at least one other listing that is not associated with the highest average amount of time;
   r) repeating steps i) through q) until the new result set created in step q) includes only one listing, wherein each time step q) is performed, n in the iteration n of steps n) and p) is increased by 1; and
   s) associating the unique hyperlink with the only one listing included in the final new result set such that selecting the unique hyperlink results in a presentation of only the only one listing.

2. The method as claimed in claim 1, wherein
step a) further comprises receiving at least one content filtering preference from the user, and
step b) comprises harvesting the original result set for the search query where the original result set is filtered according to the received content filtering preference.

3. The method as claimed in claim 1, wherein step b) comprises using a search Application Program Interface (API) to harvest the original result set for the search query, wherein the plurality of listings within the original result set is ranked according to relevance to the search query as determined by the search API.

4. The method as claimed in claim 3, wherein step b) further comprises:
receiving a first number of listings from the search API; and
defining the original result set for the search query as a second number of listings selected from the first number of listings, wherein the second number is less than the first number, and the second number of listings includes only the top most relevant listings of the first number of listings.

5. The method as claimed in claim 3, wherein step b) further comprises:
    receiving a first number of listings from the search API;
    receiving a second number of listings from the user, wherein the second number is a number of listings desired by the user to be included in the original result set; and
    wherein when the first number is equal to the second number, defining the original result set as the first number of listings from the search API;
    wherein when the first number is less than the second number, defining the original result set as the first number of listings from the search API; and
    wherein when the first number is greater than the second number, defining the original result set as the top most relevant listings of the first number of listings.

6. The method as claimed in claim 1, further comprising the following steps between steps d) and e):
    receiving selections from the user regarding certain listings within the original result set to be removed from the result set;
    removing the certain listings from the original result set as selected by the user; and
    defining the original result set as the original result set with the certain listings removed.

7. The method as claimed in claim 1, wherein step o) comprises repeating steps i) through n), wherein the single listing presented in step j) is varied until each listing of the original result set has been presented a statistically significant number of times.

8. The method as claimed in claim 1, wherein in step k), the new user selecting a hyperlink embedded within the single listing presented is an indication that the new user has stopped viewing the single listing.

9. The method as claimed in claim 1, further comprising the following steps:
    identifying listings for which an iframe issue exists, wherein iframe is an HTML element; and
    eliminating any identified listings from the original result set for which the iframe issue exists.

10. The method as claimed in claim 1, further comprising the following steps:
    identifying listings for which a header response code issue exists; and
    eliminating any identified listings from the original result set for which the header response code issue exists.

11. The method as claimed in claim 1, wherein steps p) and r) comprise the following steps of:
    p1a) calculating a result set average, wherein the result set average is an average of all amounts of time determined in step k) for all listings in the original result set;
    p1b) calculating a standard deviation of the result set average determined in step p1a);
    p1c) calculating a listing average, wherein the listing average is an average of all amount of time determined in step k) for a particular listing;
    q1a) including in a first new result set listings whose listing averages, as determined in step p1 c), are greater than the result set average, as determined in step p1a);
    q1b) including in the first new result set listings whose listing averages, as determined in step p1c), are less than one standard deviation, as determined in step p1b) below the result set average, as determined in step p1a);
    q1c) filtering all other listings;
    i2) receiving a selection of the unique hyperlink from the new user;
    j2) presenting a single listing of the first new result set to the new user that selected the unique hyperlink;
    k2) measuring an amount of time that the new member views the single listing of the first new result set as determined from a time when the single listing of the first new result set is presented to the new member and a time when the new member has stopped viewing the single listing of the first new result set;
    l2) recording the amount of time in the database;
    m2) associating the amount of time with the single listing of the first new result set that was viewed for the amount of time within the database;
    n2) associating the amount of time with an iteration n+1 within the database;
    o2) repeating steps i2) through n2), wherein the single listing presented in step j2) is varied until each listing of the first new result set has been at least presented to the new user that has selected the unique hyperlink at least once;
    p2a) filtering the viewed listings to consider only listings that had a measured time in both of steps k) and k2);
    p2b) filtering the viewed listings further to consider only listings that had at least one measured time in steps k) and k2) greater than or equal to the result set average, as determined in step p1a, minus the standard deviation, determined in step p1b;
    p2c) removing listings filtered in steps p2a) and p2b) from consideration;
    p2d) calculating a modified listing average, wherein the modified listing average is an average of all the amount of time determined in steps k) and k2) for a particular listing that is greater than or equal to the result set average, as determined in step p1a, minus the standard deviation, determined in step p1b;
    q2a) including in a second new result set listings with the modified listing average, as determined in step p2d) that is greater than the result set average determined in step p1 a);
    q2b) filtering all other listings;
    i3) receiving the selection of the unique hyperlink from the new user;
    j3) presenting a single listing of the second new result set to the new user that selected the unique hyperlink;
    k3) measuring an amount of time that the new member views the single listing of the second new result set as determined from a time when the single listing of the second new result set is presented to the new user and a time when the new user has stopped viewing the single listing of the second new result set;
    j3) recording the amount of time measured in step k3) in the database;
    m3) associating the amount of time measure in step k3) with the single listing that was viewed for the amount of time measured in step k3) within the database;
    n3) associating the amount of time measured in step k3) with an iteration n+2 within the database;
    o3) repeating steps i3) through n3), wherein the single listing presented in step j3) is varied until each listing of the second new result set has been presented to the new user that has selected the unique hyperlink at least once;
    p3) for each listing in the second new result set, calculating a new listing average using all amounts of time measured in step k), step k2), and step k3);
    q3a) including in a third new result set a listing with the highest new listing average, determined in step p3); and
    q3b) filtering all other listings.

12. The method as claimed in claim 1, further comprising the following steps to be performed between steps i) and j):
- identifying an IP address of the new user;
- associating the IP address with the unique hyperlink within the database;
- determining that the IP address is same as any IP address associated with the unique hyperlink;
- presenting a single listing of the original result set to the new user that selected the unique hyperlink with the IP address that is the same as an IP address associated with the unique hyperlink, wherein steps j) through o) are performed after the presenting the single listing of the original result set to the new user that selected the unique hyperlink with the IP address that is the same as the IP address associated with the unique hyperlink as though the presenting the single listing of the original result set to the new user that selected the unique hyperlink with the IP address that is the same as the IP address associated with the unique hyperlink had not been performed.

13. The method as claimed in claim 1, further comprising the following step performed after step h):
- receiving a selection from the user to send the unique hyperlink to a set of new users; and
- distributing the unique hyperlink to the set of new users.

14. The method as claimed in claim 13, further comprising the following step performed after step h) and before the step of receiving the selection from the user to send the unique hyperlink to the set of new users:
- receiving selection from the user regarding at least one characteristic of the set of new users; and
- distributing the unique hyperlink to the set of new users comprising the at least one characteristic.

15. The method as claimed in claim 1, further comprising the following steps performed between steps o) and p):
- identifying a measured time for the single listing that is greater than one standard deviation higher than an average measured time of all measured amounts of time for the single listing;
- normalizing the identified measured time; and
- replacing the identified measured time for the single listing with the normalized time.

16. The method as claimed in claim 1, further comprising the following step of providing the user with login access to a page containing information about progress of steps i) through s) following the user initiating the method in step a), including information about:
- progressions that have not yet reached step s), including the listings included in the original result set or the new result set as dictated by the iteration n then being processed; and
- past completed progressions through step s), including the unique hyperlink and the one listing included in the final new result set associated with the unique hyperlink.

17. The method as claimed in claim 1, further comprising the following steps:
- receiving a clicker count from the user, wherein the clicker count is a number of times the user desires the unique hyperlink that is associated with the only one listing included in the final new result set to be selected before steps b) through r) are repeated;
- counting a number of times that the unique hyperlink that is associated with the only one listing included in the final new result set is selected;
- reaching the clicker count number of times that the unique hyperlink that is associated with the only one listing included in the final new result set has been selected;
- repeating steps b) through r); and
- replacing the unique hyperlink that is associated with the only one listing included in the final new result set from a prior time step r) was performed with the unique hyperlink that is associated with the only one listing included in the final new result set from a last time step r) was performed.

18. The method as claimed in claim 1, further comprising the following steps:
- receiving an amount of time from the user, wherein the amount of time is the amount of time the user desires the unique hyperlink that is associated with the only one listing included in the final new result set to remain fixed before steps b) through r) are repeated;
- counting time from a time when step r) is last performed;
- reaching the amount of time past when step r) was last performed;
- repeating steps b) through r); and
- replacing the unique hyperlink that is associated with the only one listing included in the final new result set from a prior time step r) was performed with the unique hyperlink that is associated with the only one listing included in the final new result set from a last time step r) was performed.

19. A system for creating a unique hyperlink to a best listing from a search query result set as measured by audience interaction, the system comprising:
- at least one data processing apparatus;
- a non-transitory computer storage medium encoded with computer software and comprising a database; and
- internet connection between the at least one data processing apparatus, the non-transitory computer storage medium, and a user computer; wherein the computer software comprises instructions that, when executed by the data processing apparatus cause the data processing apparatus to perform steps comprising:
  - a) receiving a search query from a user;
  - b) harvesting an original result set for the search query, wherein the original result set comprises a plurality of listings;
  - c) storing the search query, the original result set, and each listing of the original result set in a database;
  - d) presenting the original result set, including each listing of the original result set, to the user;
  - e) creating a unique hyperlink for the original result set;
  - f) associating the unique hyperlink with the search query and the original result set within the database;
  - g) storing the unique hyperlink in the database;
  - h) presenting the unique hyperlink to the user;
  - i) receiving a selection of the unique hyperlink from a new user different from the user;
  - j) presenting a single listing of the original result set to the new user that selected the unique hyperlink;
  - k) measuring an amount of time that the new user views the single listing as determined from a time when the single listing is presented to the new user and a time when the new user has stopped viewing the single listing;
  - l) recording the amount of time in the database;
  - m) associating the amount of time with the single listing that was viewed for the amount of time within the database;
  - n) associating the amount of time with an iteration n within the database, where n is an integer;

o) repeating steps i) through n), wherein the single listing presented in step j) is varied until each listing of the original result set has been presented to each new user that has selected the unique hyperlink at least once;

p) in response to all listings of the original result set have been at least presented to the new user, for each listing, averaging all amounts of time associated with the listing;

q) creating a new result set from the original result set by including at least a listing associated with the highest average amount of time and filtering at least one other listing that is not associated with the highest average amount of time;

r) repeating steps i) through q) until the new result set created in step q) includes only one listing, wherein each time step q) is performed, n in the iteration n of steps n) and p) is increased by 1; and s) associating the unique hyperlink with the only one listing included in the final new result set such that selecting the unique hyperlink results in a presentation of only the only one listing.

20. The system as claimed in claim 19, wherein step a) further comprises receiving at least one content filtering preference from the user, and step b) comprises harvesting the original result set for the search query where the original result set is filtered according to the received content filtering preference.

21. The system as claimed in claim 19, wherein step b) comprises using a search Application Program Interface (API) to harvest the original result set for the search query, wherein the Plurality of listings within the original result set is ranked according to relevance to the search query as determined by the search API.

22. The system as claimed in claim 21, wherein step b) further comprises:

receiving a first number of listings from the search API; and defining the original result set for the search query as a second number of listings selected from the first number of listings, wherein the second number is less than the first number, and the second number of listings includes only the top most relevant listings of the first number of listings.

23. The system as claimed in claim 21, wherein step b) further comprises:

receiving a first number of listings from the search API;

receiving a second number of listings from the user, wherein the second number is a number of listings desired by the user to be included in the original result set; and wherein when the first number is equal to the second number, defining the original result set as the first number of listings from the search API;

wherein when the first number is less than the second number, defining the original result set as the first number of listings from the search API; and wherein when the first number is greater than the second number, defining the original result set as the top most relevant listings of the first number of listings.

24. The system as claimed in claim 19, wherein when the computer readable program is executed on the computer, the computer readable program causes the computer to further perform the following steps between steps d) and e):

receiving selections from the user regarding certain listings within the original result set to be removed from the result set;

removing the certain listings from the original result set as selected by the user; and defining the original result set as the original result set with the certain listings removed.

25. The system as claimed in claim 10, wherein step o) comprises repeating steps i) through n), wherein the single listing presented in step j) is varied until each listing of the original result set has been presented a statistically significant number of times.

26. The system as claimed in claim 19, wherein in step k), the new user selecting a hyperlink embedded within the single listing presented is an indication that the new user has stopped viewing the single listing.

27. The system as claimed in claim 19, wherein when the computer readable program is executed on the computer, the computer readable program causes the computer to further perform the following steps:

determining whether an iframe issue exists for each listing, wherein iframe is an HTML element; and eliminating any identified listings from the original result set for which the iframe issue exists.

28. The system as claimed in claim 19, wherein when the computer readable program is executed on the computer, the computer readable program causes the computer to further perform the following steps:

determining whether a header response code issue exists for each listing; and eliminating any identified listings from the original result set for which the header response code issue exists.

29. The system as claimed in claim 19, wherein steps p) and r) comprises the following steps of:

p1a) calculating a result set average, wherein the result set average is an average of all amounts of time determined in step k) for all listings in the original result set;

p1b) calculating a standard deviation of the result set average determined in said step p1a);

p1c) calculating a listing average, wherein the listing average is an average of all amount of time determined in step k) for a particular listing;

q1a) including in a first new result set listings whose listing averages, as determined in said step p1 c), are greater than the result set average, as determined in said step p1a);

q1b) including in the first new result set listings whose listing averages, as determined in said step p1c), are less than one standard deviation, as determined in said step p1b) below the result set average, as determined in said step p1a);

q1c) filtering all other listings;

i2) receiving a selection of the unique hyperlink from the new user;

j2) presenting a single listing of the first new result set to the new user that selected the unique hyperlink;

k2) measuring an amount of time that the new member views the single listing of the first new result set as determined from a time when the single listing of the first new result set is presented to the new member and a time when the new member has stopped viewing the single listing of the first new result set;

l2) recording the amount of time in the database;

m2) associating the amount of time with the single listing of the first new result set that was viewed for the amount of time within the database;

n2) associating the amount of time with an iteration n+1 within the database;

o2) repeating steps i2) through n2), wherein the single listing presented in said step j2) is varied until each listing of the first new result set has been at least presented to the new user that has selected the unique hyperlink at least once;

p2a) filtering the viewed listings to consider only listings that had a measured time in both of steps k) and k2);

p2b) filtering the viewed listings further to consider only listings that had at least one measured time in steps k) and k2) greater than or equal to the result set average, as determined in step p1a, minus the standard deviation, determined in step p1b;

p2c) removing listings filtered in said steps p2a) and p2b) from consideration;

p2d) calculating a modified listing average, wherein the modified listing average is an average of all the amount of time determined in said steps k) and k2) for a particular listing that is greater than or equal to the result set average, as determined in step p1 a, minus the standard deviation, determined in step p1 b;

q2a) including in a second new result set listings with the modified listing average, as determined in step p2d) that is greater than the result set average determined in step p1a);

q2b) filtering all other listings;

i3) receiving the selection of the unique hyperlink from the new user;

j3) presenting a single listing of the second new result set to the new user that selected the unique hyperlink;

k3) measuring an amount of time that the new member views the single listing of the second new result set as determined from a time when the single listing of the second new result set is presented to the new user and a time when the new user has stopped viewing the single listing of the second new result set;

j3) recording the amount of time measured in step k3) in the database;

m3) associating the amount of time measure in step k3) with the single listing that was viewed for the amount of time measured in step k3) within the database;

n3) associating the amount of time measured in step k3) with an iteration n+2 within the database;

o3) repeating steps i3) through n3), wherein the single listing presented in step j3) is varied until each listing of the second new result set has been presented to the new user that has selected the unique hyperlink at least once;

p3) for each listing in the second new result set, calculating a new listing average using all amounts of time measured in step k), step k2), and step k3);

q3a) including in a third new result set a listing with the highest new listing average, determined in step p3); and q3b) filtering all other listings.

30. The system as claimed in claim 19, wherein when the computer readable program is executed on the computer, the computer readable program causes the computer to further perform the following steps between steps i) and j):

identifying an IP address of the new user;

associating the IP address with the unique hyperlink within the database;

determining that the IP address is same as any IP address associated with the unique hyperlink;

presenting a single listing of the original result set to the new user that selected the unique hyperlink with the IP address that is the same as an IP address associated with the unique hyperlink, wherein steps j) through o) are performed after the presenting the single listing of the original result set to the new user that selected the unique hyperlink with the IP address that is the same as the IP address associated with the unique hyperlink as though the presenting the single listing of the original result set to the new user that selected the unique hyperlink with the IP address that is the same as the IP address associated with the unique hyperlink had not been performed.

31. The system as claimed in claim 19, wherein when the computer readable program is executed on the computer, the computer readable program causes the computer to further perform the following steps after step h):

receiving a selection from the user to send the unique hyperlink to a set of new users; and distributing the unique hyperlink to the set of new users.

32. The system as claimed in claim 31, wherein when the computer readable program is executed on the computer, the computer readable program causes the computer to further perform the following steps after step h) and before the receiving the selection from the user to send the unique hyperlink to the set of new users:

receiving selection from the user regarding at least one characteristic of the set of new users; and distributing the unique hyperlink to the set of new users comprising the at least one characteristic.

33. The system as claimed in claim 19, wherein when the computer readable program is executed on the computer, the computer readable program causes the computer to further perform the following steps between steps o) and p):

identifying a measured time for the single listing that is greater than one standard deviation higher than an average measured time of all measured amounts of time for the single listing;

normalizing the identified measured time; and replacing the identified measured time for the single listing with the normalized time.

34. The system as claimed in claim 19, wherein when the computer readable program is executed on the computer, the computer readable program causes the computer to further perform the following step of providing the user with login access to a page containing information about progress of steps i) through s) following the user initiating the method in step a), including information about:

progressions that have not yet reached said step s), including the listings included in the original result set or the new result set as dictated by the iteration n then being processed; and past completed progressions through said step s), including the unique hyperlink and the one listing included in the final new result set associated with the unique hyperlink.

35. The system as claimed in claim 19, wherein step j) comprises presenting the single listing to the new user in a webpage controlled and monitored by the at least one data processing apparatuses.

36. The system as claimed in claim 19, wherein when the computer readable program is executed on the computer, the computer readable program causes the computer to further perform the following steps of:

receiving a clicker count from the user, wherein the clicker count is a number of times the user desires the unique hyperlink that is associated with the only one listing included in the final new result set to be selected before steps b) through r) are repeated;

counting a number of times that the unique hyperlink that is associated with the only one listing included in the final new result set is selected;

reaching the clicker count number of times that the unique hyperlink that is associated with the only one listing included in the final new result set has been selected;

repeating steps b) through r); and replacing the unique hyperlink that is associated with the only one listing included in the final new result set from a prior time step r) was performed with the unique hyperlink that is associated with the only one listing included in the final new result set from a last time step r) was performed.

37. The system as claimed in claim 19, wherein when the computer readable program is executed on the computer, the computer readable program causes the computer to further perform the following steps of:

receiving an amount of time from the user, wherein the amount of time is the amount of time the user desires the unique hyperlink that is associated with the only one listing included in the final new result set to remain fixed before steps b) through r) are repeated;

counting time from a time when step r) is last performed;

reaching the amount of time past when step r) was last performed;

repeating steps b) through r); and replacing the unique hyperlink that is associated with the only one listing included in the final new result set from a prior time said step r) was performed with the unique hyperlink that is associated with the only one listing included in the final new result set from a last time step r) was performed.

* * * * *